US007321886B2

(12) United States Patent
Swaminathan et al.

(10) Patent No.: US 7,321,886 B2
(45) Date of Patent: Jan. 22, 2008

(54) RAPID KNOWLEDGE TRANSFER AMONG WORKERS

(75) Inventors: Kishore Swaminathan, Clarendon Hills, IL (US); Charles Nebolsky, Northbrook, IL (US)

(73) Assignee: Accenture Global Services GmbH, Schauffhausen (CH)

( * ) Notice: Subject to any disclaimer, the term of this patent is extended or adjusted under 35 U.S.C. 154(b) by 581 days.

(21) Appl. No.: 10/631,468

(22) Filed: Jul. 29, 2003

(65) Prior Publication Data

US 2005/0027696 A1 Feb. 3, 2005

(51) Int. Cl.
*G06F 17/00* (2006.01)
*G06N 5/04* (2006.01)
*G06Q 10/00* (2006.01)
*G06Q 30/00* (2006.01)

(52) U.S. Cl. ............................................ 706/60; 705/1
(58) Field of Classification Search .................. 706/60, 706/11, 927

See application file for complete search history.

(56) References Cited

U.S. PATENT DOCUMENTS

| | | | | |
|---|---|---|---|---|
| 5,987,443 | A * | 11/1999 | Nichols et al. ............... | 706/11 |
| 6,149,441 | A * | 11/2000 | Pellegrino et al. ........... | 434/350 |
| 6,256,773 | B1 * | 7/2001 | Bowman-Amuah ......... | 717/121 |
| 6,288,753 | B1 * | 9/2001 | DeNicola et al. ............ | 348/586 |
| 6,301,462 | B1 | 10/2001 | Freeman et al. ............. | 434/350 |
| 6,324,647 | B1 * | 11/2001 | Bowman-Amuah .......... | 726/23 |
| 6,345,239 | B1 * | 2/2002 | Bowman-Amuah ............ | 703/6 |
| 6,370,573 | B1 * | 4/2002 | Bowman-Amuah ......... | 709/223 |
| 6,405,364 | B1 * | 6/2002 | Bowman-Amuah ......... | 717/101 |
| 6,427,132 | B1 * | 7/2002 | Bowman-Amuah .......... | 703/22 |
| 6,471,521 | B1 | 10/2002 | Dornbush et al. .......... | 434/322 |

(Continued)

FOREIGN PATENT DOCUMENTS

WO WO 2004/038564 A2 5/2004

OTHER PUBLICATIONS

A software development support portal (SDSP) based on a peer-to-peer platform—a case study Wong, W.C.; Moy, E.; Eyadat, M.; Information Technology: Coding and Computing, 2005. ITCC 2005. International Conference on vol. 2, Apr. 4-6, 2005 pp. 467-472 vol. 2 Digital Object Identifier 10.1109/ITCC.2005.38.*

(Continued)

*Primary Examiner*—Michael B. Holmes
(74) *Attorney, Agent, or Firm*—Brinks Hofer Gilson & Lione

(57) ABSTRACT

A system and method enable rapid knowledge transfer, for example between a plurality of experts and a plurality of apprentices located remotely from the experts. The system makes use of unique tools to facilitate transfer of knowledge and collaboration between individuals, even among remotely located individuals. An input to the system is a Knowledge Transfer Plan which has been designed to orchestrate the knowledge transfer. The knowledge transfer system integrates a shared repository and collaboration tools for use by the expert and apprentice. The collaboration tools may be accessed through role-specific portals which are automatically created from the Knowledge Transfer Plan. In one embodiment, the system is configured with a World Wide Web-based interface and an integrated suite of tools to support knowledge transfer activities on a global basis to facilitate knowledge transfer among workers engaged in an outsourcing business process.

33 Claims, 11 Drawing Sheets

U.S. PATENT DOCUMENTS

| | | | |
|---|---|---|---|
| 6,473,794 B1 * | 10/2002 | Guheen et al. | 709/223 |
| 6,519,571 B1 * | 2/2003 | Guheen et al. | 705/14 |
| 6,536,037 B1 * | 3/2003 | Guheen et al. | 717/151 |
| 6,587,668 B1 * | 7/2003 | Miller et al. | 434/350 |
| 6,611,867 B1 * | 8/2003 | Bowman-Amuah | 709/224 |
| 6,615,166 B1 * | 9/2003 | Guheen et al. | 703/27 |
| 6,629,081 B1 * | 9/2003 | Cornelius et al. | 705/30 |
| 6,662,357 B1 * | 12/2003 | Bowman-Amuah | 717/120 |
| 6,701,345 B1 * | 3/2004 | Carley et al. | 709/205 |
| 6,721,713 B1 * | 4/2004 | Guheen et al. | 705/1 |
| 6,871,232 B2 * | 3/2005 | Curie et al. | 709/225 |
| 6,904,449 B1 * | 6/2005 | Quinones | 709/203 |
| 6,954,736 B2 * | 10/2005 | Menninger et al. | 705/28 |
| 6,957,186 B1 * | 10/2005 | Guheen et al. | 705/1 |
| 6,988,138 B1 * | 1/2006 | Alcorn et al. | 709/225 |
| 7,020,697 B1 * | 3/2006 | Goodman et al. | 709/223 |
| 7,039,606 B2 * | 5/2006 | Hoffman et al. | 705/26 |
| 7,054,837 B2 * | 5/2006 | Hoffman et al. | 705/28 |
| 7,069,234 B1 * | 6/2006 | Cornelius et al. | 705/26 |
| 7,072,843 B2 * | 7/2006 | Menninger et al. | 705/8 |
| 7,107,268 B1 * | 9/2006 | Zawadzki et al. | 707/9 |
| 7,120,596 B2 * | 10/2006 | Hoffman et al. | 705/28 |
| 7,139,999 B2 * | 11/2006 | Bowman-Amuah | 717/101 |
| 7,149,698 B2 * | 12/2006 | Guheen et al. | 705/1 |
| 7,165,041 B1 * | 1/2007 | Guheen et al. | 705/26 |
| 7,167,844 B1 * | 1/2007 | Leong et al. | 705/80 |
| 7,171,379 B2 * | 1/2007 | Menninger et al. | 705/28 |
| 2002/0077884 A1 * | 6/2002 | Sketch | 705/12 |
| 2002/0178181 A1 * | 11/2002 | Subramanyan et al. | 707/501.1 |
| 2003/0014482 A1 | 1/2003 | Toyota et al. | 709/203 |
| 2003/0028595 A1 * | 2/2003 | Vogt et al. | 709/204 |
| 2003/0084345 A1 * | 5/2003 | Bjornestad et al. | 713/201 |
| 2003/0149681 A1 * | 8/2003 | Frees et al. | 707/1 |
| 2003/0219710 A1 * | 11/2003 | Suiter et al. | 434/350 |
| 2004/0191744 A1 * | 9/2004 | Guirguis | 434/322 |

OTHER PUBLICATIONS

Business design for an on demand business enterprise Hong Cai; LiHua Tang; Ying Huang; E-Commerce Technology for Dynamic E-Business, 2004. IEEE International Conference on 2004 pp. 349-352 Digital Object Identifier 10.1109/CEC-EAST.2004.25.*

Empowering the content experts Swift, C.; Reisman, S.; IT Professional vol. 8, Issue 3, Jan.-Feb. 2006 pp. 25-31 Digital Object Identifier 10.1109/MITP.2006.55.*

Monitoring and controlling Internet based e-services Sahai, A.; Machiraju, V.; Wurster, K.; Internet Applications, 2001. WIAPP 2001. Proceedings. The Second IEEE Workshop on Jul. 23-24, 2001 pp. 41-48 Digital Object Identifier 10.1109/WIAPP.2001.941868.*

International Search Report and Written Opinion for international patent application No. PCT/EP2004/008471, 14 pages.

* cited by examiner

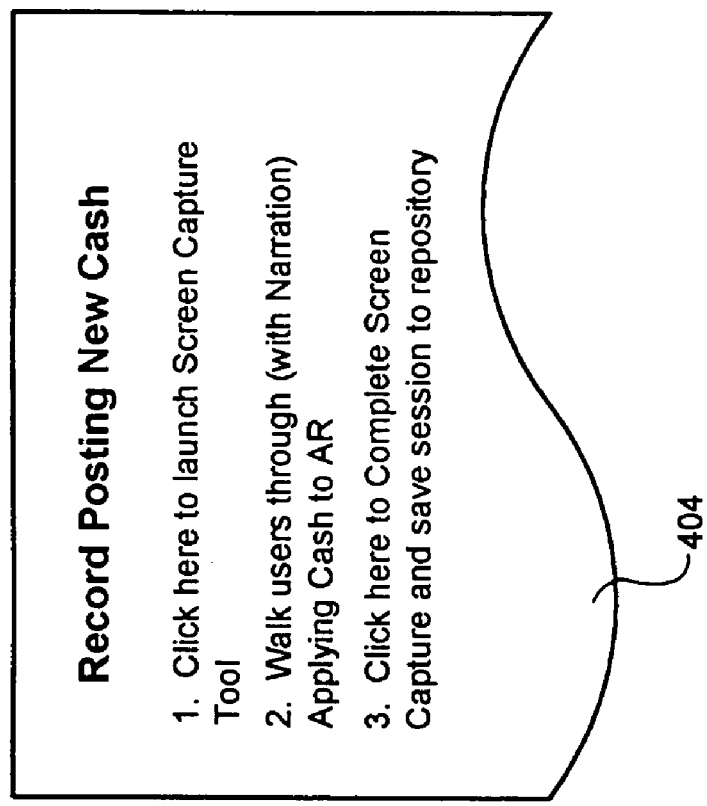
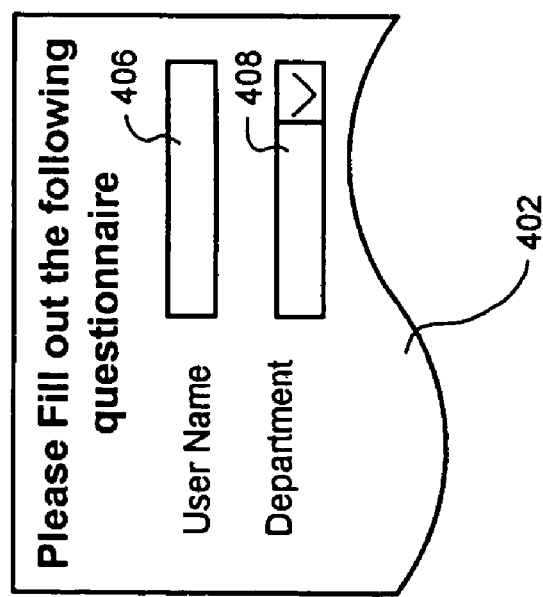
Fig. 4

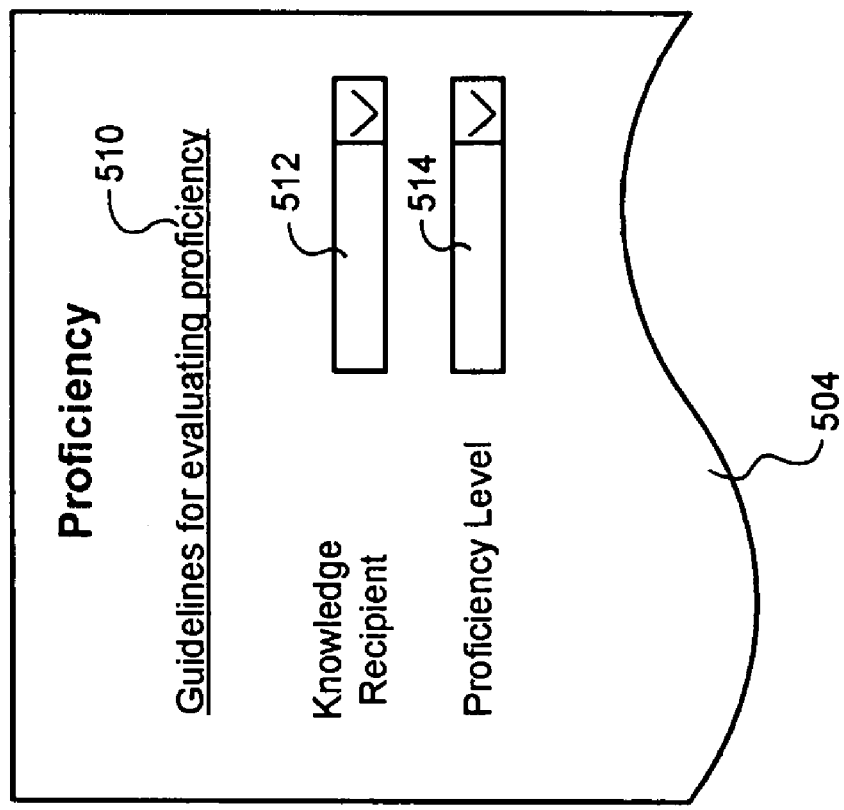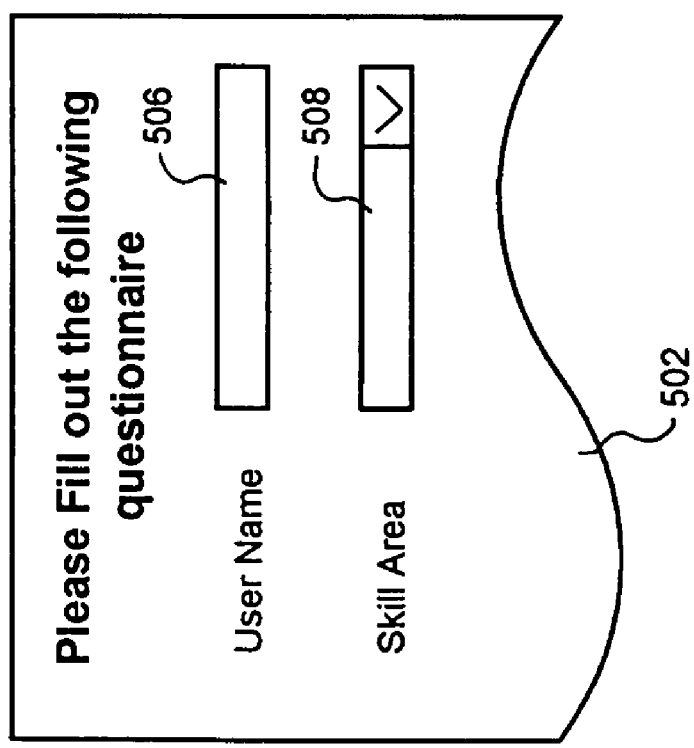
Fig. 5

| Home | Project Applications | Documents and Lists | Create | Site Settings | Help | Up to Team Web Site |

Development Instance 1
General Discussion

Use the General Discussion to hold newsgroup-style discussions on topics relevant to your team.

New Discussion | Filter

| Subject | Replies | Posted By | Modified |
|---|---|---|---|
| ⊞ How do I log into Siebel ? | | KTADEV/administrator | 5/14/2003 1:53 PM |
| ⊞ Problem solved | | KTADEV/administrator | 5/14/2003 1:54 PM |
| ⊞ Need additional screen shots for pricing procedures | | Mary E. Tomasiewicz | 5/14/2003 3:22 PM |
| ⊞ Need additional screen shots for pricing procedures | | Mary E. Tomasiewicz | 5/14/2003 3:22 PM |

Select a View
Threaded
Flat
CRM Application View ← 810
DB Application View
Mainframe Application View
Web application View — 802
Actions — 812
☐ Alert me
☐ Modify settings And columns 806
804

*Fig. 8*
800

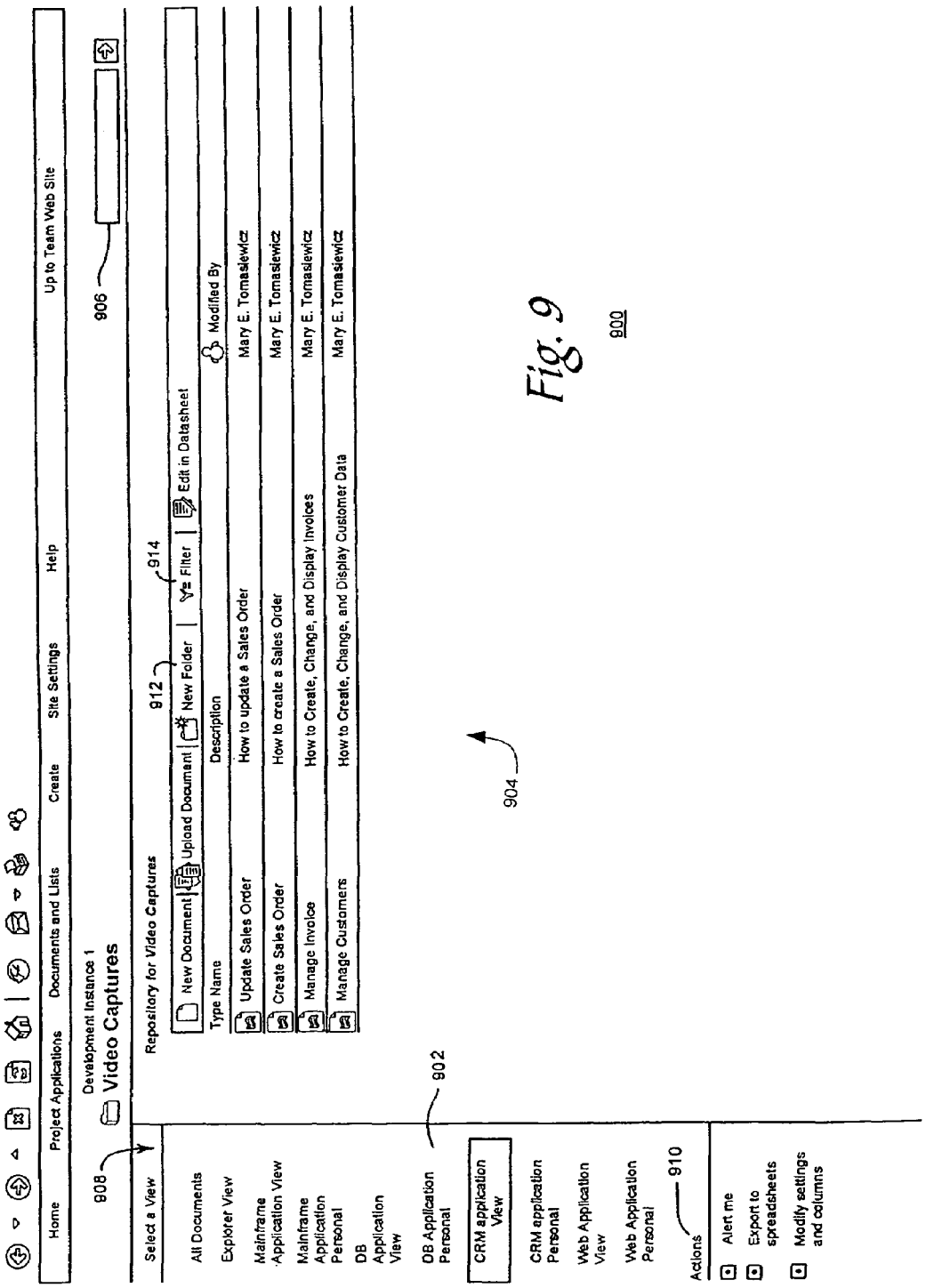

RAPID KNOWLEDGE TRANSFER AMONG WORKERS

BACKGROUND

The present invention relates generally to systems for sharing knowledge among individuals. More particularly, the present invention relates to a system and method for rapid knowledge transfer among workers. One application is a system for transferring knowledge in the context of outsourcing job functions of workers.

Outsourcing a job function or other responsibility generally involves assigning the responsibility of one or more employees of a client organization to one or more consultants of an outsourcing agency. After a transition period during which job specific knowledge is conveyed from expert employees of the client organization to one or more consultant apprentices of the outsourcing agency, the consultants assume full time responsibility for fulfillment of the outsourced responsibility.

In general, there are three kinds of outsourcing. A first kind is business process outsourcing, in which an entire business or departmental function of the client is assigned to the outsourcing agency. An example is processing of claims such as insurance claims. A second kind of outsourcing is applications management, in which all or part of an automated function of the client, such as a billing system, is transferred to the outsourcing agency. A third kind is customer service relation management, in which consultants of the outsourcing agency handle interactions with customers of the client. Ideally, the outsourcing is completely transparent to the customers, who are not aware they are interacting with consultants of the outsourcing agency.

A primary reason for outsourcing is cost savings for the client organization. This is achieved through consolidation, process transformation and job migration. By consolidating a job function for many clients in a group of outsourcing consultants, the outsourcing agency achieves economies of scale unavailable to individual clients. By transforming a business process through new technologies, standardization and other proprietary skills, an outsourcing agency can make the process more efficient and less expensive. Finally, the outsourcing agency may migrate some or all of the job functions to offshore locations such as India, the Philippines, China, etc., where labor is less expensive. Through such means, the outsourcing agency can reduce the overall cost of operating a business function and pass on some of the cost savings to the client.

The outsourcing process between the client organization and the outsourcing agency is referred to as an outsourcing engagement. From the perspective of the outsourcing agency, an outsourcing engagement has several phases. An initial process is business development, in which the outsourcing agency markets its capabilities to potential clients and develops an outsourcing agreement. A second process is transition planning, during which the client and the outsourcing agency establish the cost of making the transition. Costs include the labor costs, such as severance, hiring and relocating, and cost of tools necessary to the engagement, such as hardware and software. A third process is knowledge transfer, during with the consultant apprentices of the outsourcing agency develop the expertise of the expert employees of the client organization. A fourth process is job transition, during which the consultant apprentice takes over from the expert employee as the actual individual doing the work. Subsequently the outsourcing engagement is in steady state, with the consultants assuming full time responsibility for fulfillment of the outsourced responsibility.

The present invention deals primarily with the third phase of the outsourcing engagement—knowledge transfer between expert employees of the client and the apprentice employees of the outsourcing agency who will eventually take over the outsourced job function. The knowledge transfer phase has heretofore required extensive personal interaction between an employee expert and an assigned consultant apprentice. A process of job shadowing has been used, in which the apprentice learns the necessary knowledge directly from the expert by watching and listening and gradually performing individual job tasks under expert supervision. On a task-by-task basis, the expert certifies the apprentice as being competent to perform the task.

This level of personal interaction has proved to be very costly. The apprentices must travel to the client site, often over great distances at great expense. The apprentices must be temporarily relocated to the client site so that they can learn first hand from the experts. A typical engagement transition can extend over several months, and may involve dozens or hundreds of individuals who must be housed and fed. Since many outsourcing engagements are to offshore outsourcing agencies, apprentices need visas to travel to the client site, a need that increases administrative costs as well as opportunity costs created by visa delays. If some apprentices do not travel to the client site, real time interaction with experts from a remote location may be difficult because of the time differences between the client and outsourcing agency sites.

The outsourcing process for an enterprise of any size or complexity further involves transfer of job-related knowledge and experience from a very large number of experts to as many or more apprentices. Each expert, in turn, may perform a large number of tasks which need to be identified and classified and learned by the associated apprentice(s). Moreover, many experts may interact with an application, such as a software package or a tool or other equipment. The job-related tasks for the application must be identified, classified and taught to the apprentices. An automated process suitable for accomplishing these goals would require many man-hours to program for each engagement. Such programming requires suitably-skilled programmers able to turn process inputs and goals into operational software code for an engagement. This programming adds to the cost and time required for an outsourcing operation.

Since the outsourcing process is motivated by cost savings, these added costs reduce the feasibility of outsourcing. Accordingly, there is a need for an improved system and method for rapid knowledge transfer among workers, particularly in the outsourcing context.

BRIEF SUMMARY

By way of introduction only, the embodiments disclosed herein provide an improved system and method for rapid knowledge transfer, for example between a group of experts and their apprentices. The system makes use of unique tools to facilitate transfer of knowledge and collaboration of individuals, even among remotely located individuals. An input to the system is a Knowledge Transfer Plan (KTP) which has been designed to orchestrate the knowledge transfer process. The knowledge transfer system integrates a shared repository and collaboration tools for use by the experts and their apprentices. Based on the KTP (provided as input), the system creates a role-specific "portal" for each individual involved in the knowledge transfer process (experts, apprentices and management personnel). The portal provides a unified interface to all resources (knowledge and collaboration tools) that that individual needs in performing his or her role in the knowledge transfer process. In one embodiment, the system is configured with a World Wide Web-based interface and an integrated suite of tools to support knowledge transfer activities on a global basis.

The foregoing summary has been provided only by way of introduction. Nothing in this section should be taken as a limitation on the following claims, which define the scope of the invention.

BRIEF DESCRIPTION OF THE DRAWINGS

FIG. 4 illustrates a set of forms of an exemplary Task Completion Wizard;

FIG. 5 illustrates a set of forms of an exemplary Proficiency Evaluation Wizard;

FIGS. 6-9 are exemplary screen shots illustrating aspects of the system of FIG. 1;

DETAILED DESCRIPTION OF THE DRAWINGS AND PRESENTLY PREFERRED EMBODIMENTS

Figure 1:
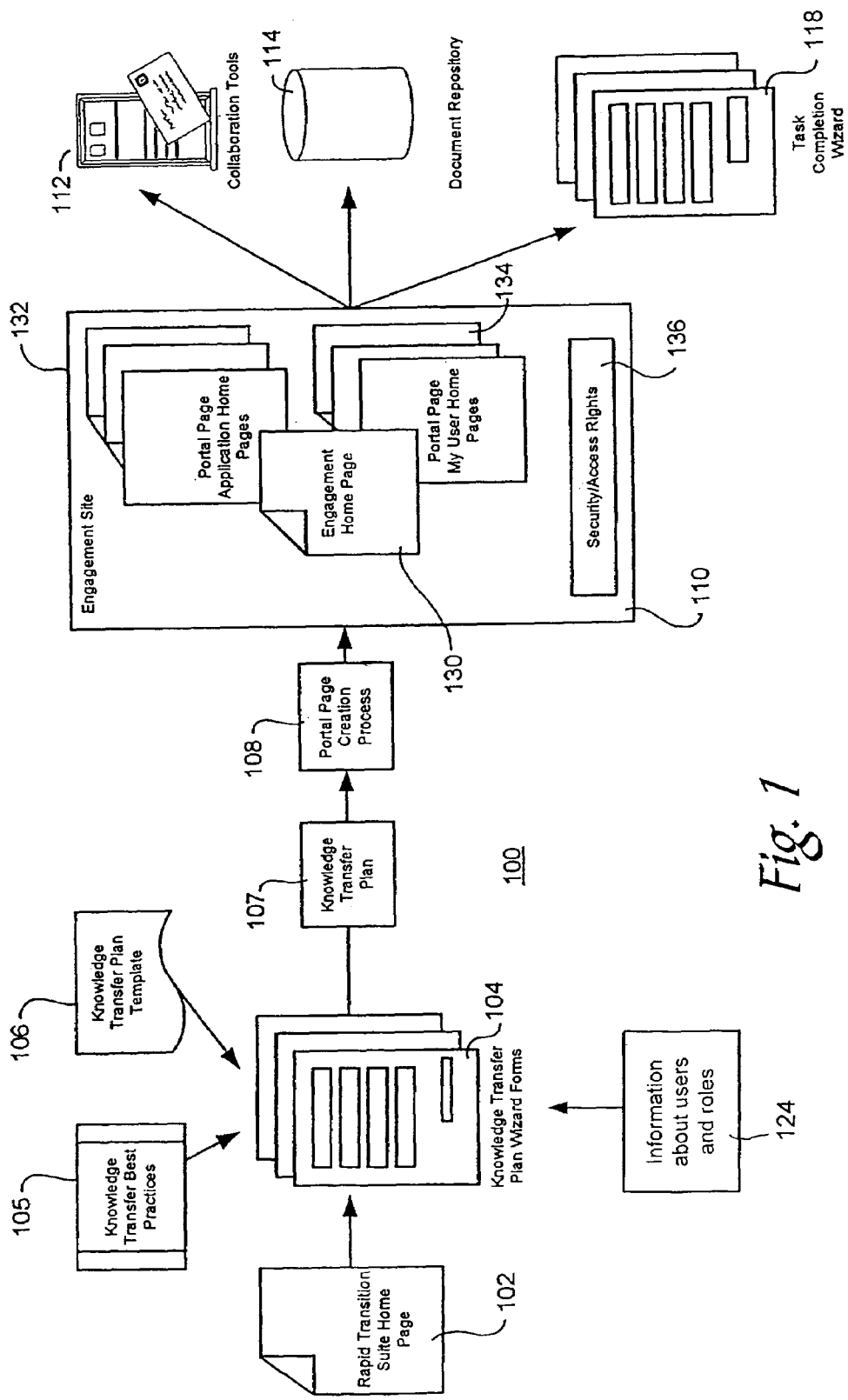
FIG. 1 is a technical block diagram of a system for rapid knowledge transfer among workers.

Referring now to the drawing, FIG. 1 is a technical block diagram of a system 100 for rapid knowledge transfer among workers. The system 100 is one exemplary embodiment of a knowledge transfer system for transferring knowledge from expert workers at a client location to apprentice workers at an outsourcing location. For example, the system may be useful for outsourcing a job function or other responsibility by a client to an outsourcing agency. In order to achieve business goals, the client engages the outsourcing agent to transition the job function from expert workers at a location of the client to apprentice workers at a location of the outsourcing agency. After the transition, the apprentice workers perform the job function on behalf of the client on an ongoing basis throughout the engagement.

The system 100 may be generally applied to transfer of knowledge in any suitable application. Examples of knowledge which may be transferred in conjunction with the system 100 include the knowledge associated with a client's financial functions, such as accounts receivable processing and accounts payable processing; customer interaction functions such as a customer call center; and business functions, such as insurance claims processing. The principles described generally herein may be readily extended to other applications as well.

An exemplary physical architecture will be described below in conjunction with FIG. 11. However, in accordance with one embodiment, the system includes a plurality of servers configured for data communication over one or more networks. A server is a computing system which provides data processing, routing and storage. Individuals engaged in the knowledge transfer operation may access data and communication resources using personal communication devices such as personal computers (PCs). The interconnecting networks may include local area networks (LANs), wide area networks (WANs), combinations of these, and the Internet. One or more networks may be wireless networks, complementing other wire line networks used for transmission of information. In the system, information being communicated and stored may include digital data, audio information and video information, in digital and other formats.

In this embodiment, data communication is generally accomplished using conventional network protocols, such as Transmission Control Protocol/Internet Protocol (TCP/IP). For example, communication and interaction with the system 100 may be implemented in accordance with conventional processes and tools used for World Wide Web (web) applications, such as web page design and publishing tools, hyperlinking, hypertext markup language (HTML), extensible markup language (XML) and other facilities. In other embodiments, other equipment and processes may be substituted.

In the embodiment of FIG. 1, the system 100 includes a Rapid Transition Suite Home Page 102, a Knowledge Transfer Plan Wizard system 104, a set of Knowledge Transfer Best Practices 105, a Knowledge Transfer Template 106, a Knowledge Transfer Plan 107, a Portal Page Creation Process 108, an Engagement Site 110 and information about users and roles 124. The system 100 further includes collaboration tools 112, a document repository 114 and a Task Completion Wizard 118. These elements illustrate in part functional aspects of the system 100 which may be implemented using data processing systems such as servers and personal computers and other components.

The Rapid Transition Suite Home Page 102 is a web page established by the outsourcing agency as a point of information about its knowledge transfer capabilities. The Rapid Transition Suite Home Page 102 is accessible by associates of the outsourcing agency, including apprentice workers, managers of the knowledge transfer process, managers of the outsourcing agency with client management responsibilities independent of the knowledge transfer process, other client management personnel of the outsourcing agency, and others.

Thus, in one embodiment, the Rapid Transition Suite Home Page 102 makes available to this audience general information on the agency's knowledge transfer capabilities. The provided information includes sales materials, such as information, data and presentation materials for making a business case for knowledge transfer and benefits realized by existing clients participating in knowledge transfer engagements. The provided information further includes status information on the agency's new knowledge transfer initiatives, such as newly available capabilities, information updates and so forth. The information further includes public information on existing engagements and details on how to request new client service. Other information and capabilities may be provided as well.

Preferably, The Rapid Transition Suite Home Page 102 is implemented as a conventional web page. As used herein, a web page is an addressable data resource storing information which is accessible by, for example, directing a web browser to a uniform resource locator (URL) associated with the web page. Preferably, access is controlled or limited so that confidential or secure information is not accessible beyond a defined domain. The web page may include any number of embedded links for navigation and information display.

The knowledge transfer system may be initiated through the Rapid Transition Suite Home Page 102. The Rapid Transition Suite Home Page 102 provides access to the Knowledge Transfer Plan Wizard ("KTPW") system 104. The Knowledge Transfer Plan Wizard system 104 is a set of form-driven web pages that lead users through processes of creating or updating online transition plans. The forms, in one embodiment, contain text input blocks and other input devices configured to receive user-defined application and user information.

In other embodiments, any sort of information-receiving apparatus may be used. For example, the Knowledge Transfer Plan Wizard system 104 may access previously stored data in files identified to the system KTPW 104. However, using on-line accessible web pages which are configured to directly receive information from a user provides advantages of user-friendliness. One design goal of the system 100 is permitting anyone, including a non-technically trained individual to manage the knowledge transfer process, including developing a Knowledge Transfer Plan for the engagement. The individual may have expertise in areas other than data processing systems, such as financial accounting, but may still initiate and manage the knowledge transfer process using the Knowledge Transfer Plan Wizard (KTPW) system 104.

Examples of the information received by the web page forms include but are not limited to (a) knowledge and computer applications to be transitioned from the client's expert workers to the outsourcing agency's apprentice workers; (b) the usernames of current owners, meaning one or more expert workers currently associated with an application; (c) target owners, meaning one or more apprentice workers to whom the expert's knowledge is being transferred; (d) and details about the application. Such details might include information about the complexity of the application, the type of application, the application's category, and information about a vendor of tools related to the application.

In one embodiment, a user directs the browser of a PC to a web page which provides access to the Knowledge Transfer Plan (KTPW) system 104. The web page is retrieved and served to the browser by a server of the network. The server, by serving the web page, implements or instantiates the system 104. The server conventionally includes a processor and a memory. The server thus forms or includes a processor configured to present a query or a series of queries to a know-how expert. The query includes questions associated with one or more defined roles for the procedure to be transferred. The server memory stores the answers to the query. The processor then creates role-specific portals based on the answers to the query. Each role-specific portal is associated with one or more defined roles.

The Knowledge Transfer Plan Wizard system 104 is a mechanism by which the user can custom-create a Knowledge Transfer Plan 107 for a specific engagement. This can be done by adapting the outsourcing agency's preferred and prescribed methodology for knowledge transfer. KTPW System 104 accomplishes this by taking as input (a) a set of Knowledge Transfer Best Practices 105 and (b) a Knowledge Transfer Template 106.

The Knowledge Transfer Best Practices (105) provide tips and advice to the user on established techniques for accomplishing specific knowledge transfer tasks. An example of a best practice might be advice on how to plan the transfer of an expert's trouble shooting or debugging skills to a novice. Another example may be standard ways of estimating the time it typically takes an expert to train a novice on how to use a computer application. Such an estimate might be based on the number of screens that the novice will have to become familiar with and the number of user tasks supported by each screen.

The Knowledge Transfer Templates 106 are the outsourcing agency's standard templates for creating Knowledge Transfer Plans. The templates included in one embodiment cover the following exemplary areas: business processes, methodologies, organizational structure and change management, and project, program, service, relationship and knowledge management. Other areas may be included as well. For each area, the templates provide checklists of typical tasks that need to be accomplished by most knowledge transfer engagements. Examples include but are not limited to tasks such as overview of system architecture, login procedures, system start-up procedures, maintenance and backup procedures etc. The templates may also include standard time frames for the completion of each task.

The Knowledge Transfer Plan Templates 106 may be maintained and stored in any format including database tables, HTML or XML pages or spreadsheets. In general, the templates 106 include data and instructions defining tasks, timelines and other information which is suitable for input to the Knowledge Transfer Plan Wizard system 104.

The Knowledge Transfer Plan Wizard system 104 takes as input the Knowledge Transfer Best Practices 105 and Knowledge Transfer Plan Template 106 and enables the user to create a Knowledge Transfer Plan 107 for a specific engagement. KTPW System 104 accomplishes this by presenting a series of web pages to the user and directs the user to provide necessary information. The system 104 responds to the user's inputs with further queries tailored to prompt the user to provide additional necessary information that will constitute the Knowledge Transfer Plan 107 for the specific engagement. Thus, the user is guided with standard tasks that are usually necessary to be completed during the knowledge transfer process. Further, the user is presented with standard timeframes for completion of the tasks. The user's inputs in response to these prompts control subsequent prompts or form fields presented to the user. The standard tasks and timeframes may also be updated, customized or supplemented to produce an accurate transition plan for each application. This results in the consolidated Knowledge Transfer Plan 107 that contains all the planning information necessary for accomplishing knowledge transfer for an engagement. The information included in Knowledge Transfer Plan 107 are described above. Other input sources such as preexisting data files may be used in addition to or instead of those shown in FIG. 1.

The Knowledge Transfer Best Practices 105 are stored conventionally on a server or database accessible over a network. The Best Practices 105 may take any suitable form, and the form will be tailored to the nature of the particular process. Examples of the form of a Knowledge Transfer Best Practices 105 include data in a database, code portions which implement functions, routines or expert systems, web pages which provide information, request user input, or a combination, etc. It is expected that the set of Best Practices 105 will be supplemented and revised, and generally grow over time, as experience in knowledge transfer is obtained and refined.

In one embodiment, the knowledge transfer plan 107 is created using an engagement setup application. This application includes one or more ASP.NET pages that access a SQL server database. The application creates a SharePoint site for use in conjunction with the SharePoint application available from Microsoft Corporation, Redmond, Wash. The application is initiated by a transition specialist who has knowledge of the information and tasks to be transferred, experts who currently own information and apprentices to whom knowledge is to be transferred. The transition specialist begins the process by providing to the application basic information about the engagement, such as a name of the engagement, a name of transition specialist, etc., in ASP .NET forms. The SQL database is updated and the engagement setup application launches a methodology wizard. This wizard includes a set of ASP .NET form driven pages that determine the methodology and the corresponding knowledge transfer plan wizard based on the transition specialist's input. In addition, this wizard performs administrative tasks, such as creating users, defining vocabulary, etc., necessary to create SharePoint sites for use by the SharePoint application. Once all the data is gathered in the SQL database, a server-side ASP.NET application uses the data to create a SharePoint repository using the SharePoint object model.

This embodiment includes an engagement setup tool. The methodology wizard creates the ASP.NET pages that display the appropriate methodologies, as text and Excel templates, based on the engagement's attributes as specified by the transition specialist. The knowledge transfer plan setup wizard is the initial step in creating the SharePoint site. Through ASP .NET forms, a transition specialist identifies the engagement name, the initial transition specialists and team members. Users are created in SharePoint based on the information specified. This information is submitted and verified before progressing to the next module, the analysis wizard. Each user who is granted access receives a log in identification and a password to access this wizard. The Knowledge Transfer Plan Template 106 includes data and instructions defining tasks, timelines and other information which is suitable for input to the Knowledge Transfer Plan Wizard System 104.

Figure 2:
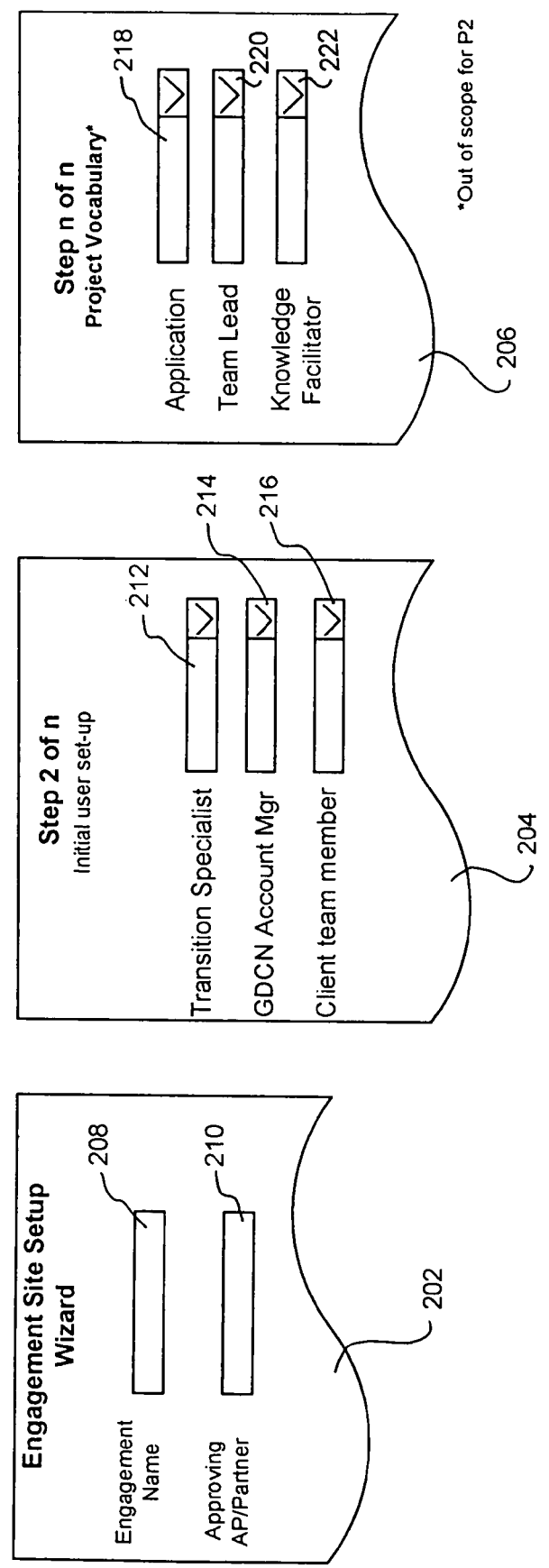
FIG. 2 illustrates a set of forms of an exemplary Engagement Site Setup Wizard.

FIG. 2 illustrates a set of ASP .NET forms of an engagement site setup wizard. A first form 202, a second form 204 and a third form 206 are shown. In a typical application, a large number of forms may be required to collect all the necessary information to define the engagement.

The first form 202 includes a window 208 for entry of an engagement name and a window 210 for entry of an approving senior executive or other authorized individual of the outsourcing agency. The second form 204 prompts the user for additional information. The second form 204 may be accessed automatically upon completion of the first form 202. The second form 204 includes a pop-up menu 212 for definition of a transition specialist, a pop-up menu 214 for definition of an account manager and a pop-up window 216 for definition of a client team member. The third form 206 similarly prompts the user to define the project vocabulary. Thus, the third form 206 includes a pop-up menu 218 for specifying an application to be transferred. Associated with that application is a team leader, specified at pop-up menu 220. Also associated with that application is a knowledge facilitator or expert (from whom the knowledge about that application will be transferred to apprentices), specified at pop-up menu 222.

It is to be understood that the forms illustrated herein are exemplary only. For other applications, other types of data collection may be substituted. The illustrated forms are particularly useful, though, where a non-technically trained transition specialist is establishing the engagement site. The forms offer an intuitive, guided approach to information collection.

After verification through a log in form, the transition specialist provides the engagement's attributes, such as complexity, transition type, etc., in additional ASP .NET pages such as though illustrated in FIG. 2. These pages communicate the data to be stored in a SQL database. Based on the Knowledge Transfer Plan Analysis Wizard data, the application queries a SQL database for the appropriate methodology text. This text is displayed in static ASP .NET pages. In addition to static text, the Knowledge Transfer Plan Analysis Wizard data is used to query a SQL database for the appropriate methodology.

As noted above, in this exemplary embodiment, the Knowledge Transfer Plan Wizard creates the SharePoint Knowledge Transfer Plan for the engagement based on data entered in ASP .NET forms. After the methodology is displayed, a set of ASP .NET form driven pages walks the transition specialist through the creation or update of online Knowledge Transfer Plans. In the Knowledge Transfer Plan Wizard, the transition specialist is prompted in ASP .NET pages to map project vocabulary to the application's default vocabulary. This information is stored in a SQL database. For each engagement, the transition specialist is prompted to enter the number of applications to be transferred. Based on this number, the Engagement Setup Application prompts the user with a series of ASP .NET forms to gather information for each application. As the user completes each form, the data is sent to a SQL database. Alternatively, the transition specialist may also have an option to upload an existing Knowledge Transfer Plan created in Microsoft Excel.

Figure 3:
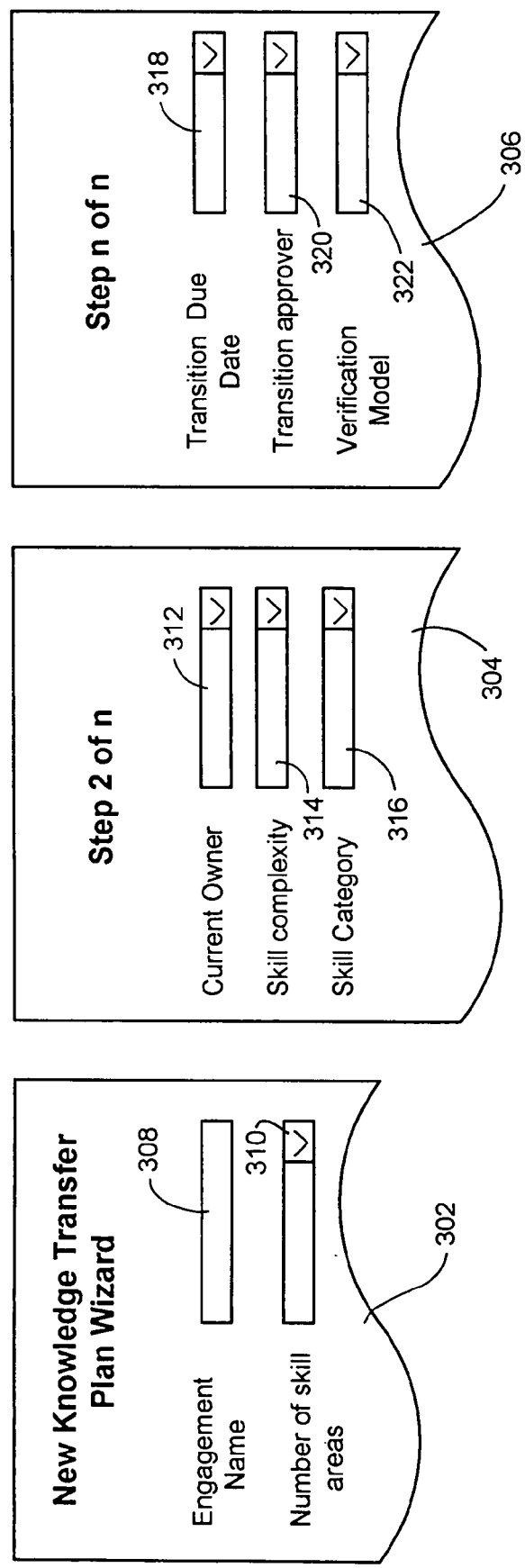
FIG. 3 illustrates a set of forms of an exemplary Knowledge Transfer Plan Wizard.

FIG. 3 illustrates a set of ASP .NET forms of an exemplary Knowledge Transfer Plan Wizard. FIG. 3 shows a first form 302, a second form 304 and a third form 306. In a typical application, a large number of forms may be required to collect all the necessary information to define the engagement.

The first form 302 includes a window 308 for receiving an engagement name and a pop-up menu 310 for specifying a number of skill areas. Entry of this and other information in the first form automatically calls up additional forms, such as the second form 304. The second form 304 includes a pop-up menu 312 for definition of a current owner or current expert. A pop-up men 314 permits specification of the complexity of the required skill and a pop-up menu 316 permits categorization of the skill. After completion of the second form 304, a subsequent form such as third form 306 is presented for completion by the user. The third form 306 includes additional data entry points, such as a pop-up menu 318 for entry of a transition due date for the engagement or the skill are, a pop-up menu 320 for identification of a person designated to approve the transition of the skill area and a pop-up menu 322 for specification of a verification model.

It is to be understood that the forms of FIG. 3 are exemplary only. For other applications, other types of data collection may be substituted.

As an additional feature, in some embodiments, the ASP.NET web applications that are used to create the Knowledge Transfer Plan Wizard can be encapsulated as a Microsoft SharePoint Web Part. This allows the Knowledge Transfer Plan Wizard to be imported into Microsoft SharePoint and used within a SharePoint site. In order to accomplish this, a specific aspect of the SharePoint Object Model is utilized. By using the Microsoft SharePoint Web Part Pages library, additional lines of code are added to the ASP.NET web form used for the Knowledge Transfer Plan Wizard to convert the wizard from a Web Form Control to a Web Part. Namely, the WebPart class and its RenderWebPart() and CreateChildControls() methods are used to create the KTP Wizard Web Part.

The Web Part Architecture in Microsoft SharePoint allows for the interactive connectivity of Web Parts on a page. This capability allows for added functionality for the Knowledge Transfer Plan wizard. With the main Knowledge Transfer Plan wizard sitting as the main Web Part on a Microsoft SharePoint page, two other Web Parts, one to monitor the overall progress of the user's Form Input Process, and the other to display help information about the current step in the user's Form Input Process, also sit on the SharePoint Smart Page. These supplemental Web Parts take status information from the main KTP Wizard Web Part, and dynamically display information as a result.

To make Web Parts in Microsoft SharePoint connect to one another, two important SharePoint interfaces are implemented for each Web Part. These are the ICellProvider and ICellConsumer. Event handlers and methods in these interfaces also need to be implemented to allow information from one Web Part to be passed into another.

The information about roles and users 124 is determined by each engagement. This information 124 is used as an input to the Knowledge Transfer Plan Wizard system 104. In one example, generic roles are determined in association with standard processes.

The generic roles may be tailored by operation of the Knowledge Transfer Plan Wizard system 104 in accordance with the particular engagement. For example, for a particular application, there is assigned a knowledge owner, a knowledge recipient and a transition manager. The knowledge owner corresponds to the expert worker of the client. The knowledge recipient corresponds to the apprentice worker of the outsourcing agency. The transition manager is an individual who may be employed by either the client or the outsourcing agency. By way of example, in response to operation of the wizard system 104, the knowledge recipient may be modified to define two knowledge recipients instead of one. Individual names are provided through the wizard system 104 and mapped to each role.

The portal page creation process 108 receives data and other information provided by the user of the Knowledge Transfer Plan Wizard system 104. The portal page creation process 108 maps the information entered using the Knowledge Transfer Plan Wizard system 104 about the engagement, each application, and the users to a standard knowledge transfer methodology based on additional inputs, such as the best practices defined by the Knowledge Transfer Plan Best Practices 120. From this mapping, the Knowledge Transfer Engagement Site 110 is created. Further, all pages created by the portal page creation process are integrated with other facilities required by the knowledge transfer process, such as the collaboration tools 112, the document repository 114 and the Task Completion Wizard system 116.

The portal page creation process 108 in one embodiment is implemented as code and data operating responsive to predetermined knowledge transfer plan data for configuring program code and the associated data defining role specific portals. This program code and associated data define role specific portals for individual expert workers and apprentice workers. The code and data operate on a server of the system 100. The code controls a processor of the server to perform the functionality described herein, as well as other functionality. The processor, in conjunction with the code and data, accesses data stored on a memory system such as the document repository 114 in the system 100 in response to operation of the Knowledge Transfer Plan Wizard system 104. The processor responds to the code and the data to create a plurality of new web pages at the engagement site and to create the necessary linkages among the web pages and between the pages and facilities such as the collaboration tools 112, the document repository 114 and the task completion wizard system 116. Among the new web pages created are the role specific portals for the individual workers. Additional information about the portal page creation process 108 is provided below in conjunction with FIG. 6.

In one embodiment, the portal page creation process includes a SharePoint repository creation application. This application is a server-side application implemented on a SharePoint server of the system. This application retrieves the basic engagement and application-specific data of the Knowledge Transfer Plan 107 and uses that data to incrementally create the Microsoft SharePoint document repository 114 for the engagement. The SharePoint object model is used extensively in this embodiment to accomplish aspects of this task.

An important component of the SharePoint document repository 114 is the creation of SharePoint Smart Pages using Page Templates. Smart Pages hold Web Parts to display information about the engagement and its applications. The SPWebCollection class is used to create a new site with its Add() method. To apply a template to the pages created, several pages on the SharePoint server are modified in the server's LAYOUTS folder.

In this exemplary embodiment, users and their roles are created based on data stored in the Knowledge Transfer Plan 107. To add new users, the following object model elements will be utilized:

SPRole is used to access and create new users and roles. A new user can be added using the Adduser() method.

SPPermission is used to access and create the permission assigned to a user, site group, or cross-site group for a list or a site.

SPPermissionCollection is used to obtain a collection of SPPermission objects.

Tasks and their information are created based on data stored in the Knowledge Transfer Plan 107 database. Tasks are considered lists in SharePoint. To add new tasks, the following object model elements are utilized:

SPListCollection is used to obtain collection of lists in a site. A new list can be added to this collection by using the Add() method.

SPList is used to access a list on a SharePoint site.

Events and announcements are created based on data stored in the Knowledge Transfer Plan 107 database. Events and announcements are considered lists in SharePoint. To add new events, the following object model elements are utilized:

SPListCollection is used to obtain collection of lists in a site. A new list can be added to this collection by using the Add() method SPList-will be used to access a list on a SharePoint site.

To facilitate the intelligent storage of documents in the SharePoint repository, a folder structure is created based on data stored in the Knowledge Transfer Plan 107 database. To create new folders, the following object model elements are utilized:

SPSite is used to access existing folders in the repository. For example, to access the "Shared Documents" repository, SPSite.GetFolder("Shared Documents") is used.

SPFolder is used to access and create new folders. For example, to create a new folder, SPFolder.Create() is used.

At the core of every list in the SharePoint repository is a set of views that filter list data for each engagement application. A view is created for each application to display application specific content on a SharePoint Smart Page. To create new views, the following object model elements are utilized:

SPViewCollection are used to obtain a list of Views that exist for a List type.

A new view can be added to this collection by using the Add() method.

SPView is used to define and customize a new view for a List type. Once implemented, the SPView object will be entered into the SPViewCollection.Add() method described above.

The engagement site 110 is a set of web pages and associated data and information which is created by the portal page creation process 108 for the particular engagement between the client and the outsourcing agency. The engagement site includes an engagement home page 130, application home pages 132, user home pages 134 and security and access rights 136.

The engagement home page 130 provides an overall view of the knowledge transfer process for the benefit of client managers. One example of an engagement home page 130 will be described below in conjunction with FIG. 6. The engagement home page 130 provides links to specific application home pages 132 to permit easy navigation between the home page 130 and the application home page 132. The application home page 132 further includes analysis tools which have the ability to track key metrics, milestones and status. The key metrics are defined specifically according to the Knowledge Transfer Plan for specific roles and applications. Product, status and success factors are tracked by resource and by application. In some embodiments, a calendar and schedule may be displayed for all applications. Milestones and key dates may be highlighted in any suitable fashion on the calendar and the schedule.

In the illustrated embodiment, the engagement home page 130 is implemented as a web page with controlled access. The page 130 is accessed by directing the user's web browser to the URL of the page 130. The page 130 includes data, text, graphics and other information for the use of individuals involved with the knowledge transfer process. Only individuals with appropriate access rights can retrieve the page 130.

Preferably, the engagement home page 130 includes a link to the Knowledge Transfer Plan Wizard system 104. By activating this link and proceeding through the Wizard system 104, the knowledge transfer process may be updated as schedules change, progress is made and experience is obtained.

The application home pages 132 provide a central team view of all knowledge to be transferred for a single application. One example of an application home page will be described in further detail below in conjunction with FIG. 7. Current knowledge owners, such as expert workers of the client, and knowledge recipients use this web page as a single point to perform knowledge transfer for each application. In one embodiment, the application home page 132 for an application tracks key tasks, documents and discussions for current application owners and application recipients. In the exemplary embodiment, the current application owners are the expert workers of the client associated with the application. The application recipients are the apprentice workers of the outsourcing agency. The application home pages include code portions which compile and process information about the associated applications. Examples include tasks, milestones, contacts, discussions and documentation.

Preferably, the application home page 132 includes a hypertext link or other access to the Knowledge Transfer Plan Wizard system 104. By activating this link and proceeding through the wizard system 104, the knowledge transfer process is updated to reflect schedule changes, progress made and experience obtained.

The user home pages 134 provide each user with a combined view of all applications assigned to that individual user. A user is any individual given access to one or more pages of the system 100. A user may be an expert, an apprentice, a manager or another person involved with the knowledge transfer process. The user home pages 134 are configured as web pages accessible by redirecting the user's web browser to the URL associated with the web page. Each user home page 134 includes data, text, graphics and other information tailored to the individual user based on the Knowledge Transfer Plan. Further, in the illustrated embodiment, each user home page 134 provides links to application home pages 132 associated with each user. Still further, each respective user home page 143 includes code portions, links to routines or other facilities to track key tasks, milestones and status for the individual user. For users associated with multiple applications, the user home pages 134 provide a central location for all user relevant information.

The security and access rights 136 of the engagement site 110 ensure that users can access only areas of the system 100 to which their access has been defined based on the users' respective role in the transition process. Each user has preassigned, predefined access rights. Site security is responsive to these access rights. The access rights as applied to pages of the engagement site 110 are designated by access control lists and by filtered application views. Access rights are applied to engagement pages, application pages, web parts and individual items. Items in the system 100 for which access rights are defined may have user-based or application-based security, depending on the roles defined in the portal page creation process 108. Roles and user groups are defined by information about roles and users 124.

The security and access rights 136 in one embodiment are maintained as lists of users with access to locations of the system. The locations may be defined by web page URL or any other identifier. The access may be graded, such as read-only access, read-write access, no access, etc. Further, the security and access rights 136 may be maintained as data and code which limits the extent of web page data conveyed to a user upon doing a page read. For example, depending on the content of the security and access rights 136, data defining a hyperlink to a portion of the system 100 may be suppressed so that an unauthorized user may not be given click-through access to the system portion. In still another embodiment, the system and access rights may be stored as group lists defining groups of users and the security and access rights associated with each group.

The collaboration tools 112 are used by current knowledge owners and their associated apprentices to complete knowledge transfer tasks and to capture ad-hoc information. The collaboration tools 112 bring together the voices, screens, and computations of peers to improve productivity in the workplace. Program code defines the collaboration tools 112 or systems for two-way and other communication between individual expert workers and individual apprentice workers. Examples of the tools incorporated within the collaboration tools 112 are described here.

One example is a tool which creates discussion threads among users. A discussion thread is a text based query and response system in which text messages are displayed on screen. The messages are organized hierarchically and by subject, so that new message threads may be spun off of existing threads in order to focus a discussion on an identified topic. Access to the threads is controlled, for example by the security and access rights 136. For example, access to a thread might be given to only an expert worker, his apprentice and their respective supervisors. One example of a page for access to discussion threads will be described below in conjunction with FIG. 8.

A second collaboration tool allows a user to initiate an Instant Messaging session. Instant Messaging is a set of software processes that allow text-based communication between two or more users. In an Instant Messaging session, a temporary communication link is created over the network between the participants. Communication can be substantially real-time. A text message may also include an attachment such as a data file. Upon completion of the session, the communication link is ended. Instant Messaging is well suited to communication between users who work simultaneously but separately.

For efficient knowledge transfer, it is helpful for users to refer to an old, secure conversation they previously had with somebody, such as an expert or a peer. For example, if a user had an Instant Messaging session ("IM'ed") with another user regarding learning how to perform a task and forgot one of the steps, the user can refer back to the archived chat sessions and recreate what the expert had explained. In one embodiment, multi-party IMs (anywhere from 2 to 32 concurrent members) are possible. Any of the parties can add new callers to the session.

Archiving IM conversations is a functionality of the preferred embodiment. An IM Archiving Service that provides security and SEC-compliant archiving for instant messages is installed into a Structured Query Language (SQL) database ("DB") in the system's SharePoint content repository (as .MDF and .LDF files) with query/reporting capabilities. In this embodiment, the following information is logged per conversation:
Time & Date of conversation
From (the originating party)
To (the destination)
CallID (the unique session ID of the IM session)
CSeq (unique ID of given message within sequenced session)
The content of the entire IM More or less or alternate information may be stored as well.

In order to retrieve IM conversations in the future, metadata should be associated with each conversation to search for useful conversations from the others when locating for help on a particular subject. This should be done automatically as an IM conversation is logged. Preferably, the metadata includes at least some of the following:
User names of parties conversing
Application relation. This can be accomplished by having a user select a "topic" before initiating the conversation that is automatically stored A user looking for a certain conversation can enter a word or phrase. The system automatically searches through the metadata and retrieves all conversations that match the search criteria. The user then selects a conversation which is opened for viewing.

A third collaboration tool allows a user to send electronic mail messages. An electronic mail message generally includes text but may have data files and other attachments. The electronic mail message is addressed by the author and sent. The network routes the message to the recipient and delivers the message for storage in an inbox associated with the recipient. The recipient can retrieve the message at any time. Electronic mail messages are well suited to communication between users who do not work simultaneously, due to time zone differences, for example.

A fourth collaboration tool allows a user to initiate audio and video messages. The author speaks for audio recording or performs before a camera for video recording. The audio or video is converted to digital form, if appropriate, and is then conveyed to the recipient. Communication may be through any suitable channel or in any suitable format. For example, the audio or video information may be attached to an electronic mail message, or may be stored to a central location while a message is sent to the recipient prompting the recipient to retrieve the stored information. One example of a page for access to captured video information will be described below in conjunction with FIG. 9.

A fifth and a sixth collaboration tools relate to screen sharing. Screen sharing is an important aspect of the rapid and efficient knowledge transfer. Transferring knowledge remotely would be limited without the ability of the client team to capture day-to-day efforts visually for the outsourcing agency's team to view. As noted above, screen sharing is comprised of two types of collaboration. Asynchronous collaboration involves capturing a screen as an image or screen activity as a video for viewing later. Synchronous collaboration involves real-time sharing of a screen between two users to simulate "over the shoulder learning." Both are preferably incorporated into the knowledge transfer application.

The sixth collaboration tool allows a user to record moving screen captures with voiceover narrative. This extends the capability of the fifth collaboration tool, screen capture, described above. The user initiates the screen capture process. Subsequently, until the screen capture process is ended, all screen display information is saved to a file for playback. This includes the initial screen display, mouse or cursor movements, changes to the display, pop up or pull down menu appearances, and so forth. Anything the capturing user sees on the display screen is captured and stored. After retrieval by the recipient, the recipient sees a complete playback of all screen information as recorded. In some embodiments, the playback may be stopped, slowed, reversed, and so forth. Further, in some embodiments, the capturing user can provide a voiceover description or narration of the process being captured. This audio information is also stored and played back to the recipient, with the voiceover narration synchronized to the activity on the screen.

In one embodiment, a product known as SnagIt is used to enable asynchronous collaboration capabilities. SnagIt is available from TechSmith Corporation, Okemos, Mich. SnagIt is capable of taking snapshots of a screen to save as an image and recording video and audio to create movie files of users performing actions on their desktop. This product also provides the capability to integrate screen capture capabilities within the Knowledge Transfer Plan application when necessary.

To activate a SnagIt session, the user will need to launch the SnagIt application. Once the user is in the SnagIt application, the user must select the image capture type by proper menu activation, such as clicking Tools->Image Capture. Once this is complete, the user can select the type of screen capture to perform. In one embodiment, this can range from a region of the screen, the active window, or the entire screen. After selecting the desired type of screen capture, the user can select a capture button on the user interface and capture the screen. Immediately after capturing the screen, a prompt will show that will allow users to save the image.

Video capture using the SnagIt product is similar to screen capture as described above. The user starts by selecting Video Capture from the application menu. The user then selects the type of screen capture to perform. After selecting the type of screen capture, the user can click a capture button on the user interface and capture the screen. Immediately after capturing the screen activity, the user selects a stop operation and a prompt allows the captured screen shot to be saved.

The seventh collaboration tool allows a user to capture personal computer desktop item and screenshots, with annotation. As the user operates a computer application, the image displayed on the user's computer display changes to reflect the progress of the computer application. At any point, the user may capture the display. The display is formatted to any convenient form and stored. The stored information is subsequently retrieved by the intended recipient who then sees exactly the same content on his display screen that was captured by the user. Since the screen information is stored, it can subsequently be used and re-used. A conventional screen capture tool may be used to implement this capability or a custom design may be provided.

Similar to asynchronous collaboration, real time application and screen sharing allows for another layer of remote communication, and assists in the knowledge transfer process by simulating "over the shoulder learning." Synchronous collaboration allows one or many other team members to get a view of a user's entire desktop or a particular set of chosen applications, as part of an interactive session. During this session, activity relevant to a job function can be visually displayed for others to see.

It is to be understood that other types of audio, video and screen capture may be substituted for the method and product described here. The description provided here is exemplary only.

This list of collaboration tools is intended to be exemplary and not exhaustive. Other types of collaboration tools which may be subsequently developed or which employ complementary technologies, such as wireless communication, may be added to the collaboration tools 112 accessible in the system 100.

Preferably, the collaboration tools 112 may be accessed from any page within the system 100. Thus, if in one example, an apprentice may need additional instruction on completion of a particular task for an application as defined by the Knowledge Transfer Plan and involving a computer application, the apprentice may initiate an Instant Messaging session with the expert associated with the task. The Instant Messaging session or any of the collaboration tools may be initiated by, for example, manipulating a pop up menu on the user's display screen.

In response to inquiries in the Instant Messaging session, the expert may respond to the apprentice by initiating a screen capture. During the screen capture session, the expert manipulates his personal computer to perform the task. The display is captured along with the expert's voiceover narration, if provided. The captured screen display is conveyed to the apprentice who plays back the captured session and sees an example of task completion. The captured session may be played back repeatedly by the apprentice or by other apprentices to reinforce the knowledge transfer.

For some tasks, the use or provision of individual collaboration tools may be driven by the requirements of the task. For example, if the task does not require computer operation, screen capture may provide no benefit. To accommodate this, when the user home pages 134 are created by the portal page creation process 108, the pop up menus or other access devices for the collaboration tools 112 may be tailored to exclude those which do not apply to a task.

The collaboration tools 112 may include standard, off the shelf products, such as electronic mail packages that are commercially available. Microsoft Outlook by Microsoft Corporation is an example. The SnagIt product from TechSmith Corporation is another example. In other embodiments, custom tools may be provided or combined with commercially available products. For example, a custom screen capture tool may be used to perform the screen capture process. The tool may be combined with a commercially available data compression system to reduce the size of the output data file for storage and transmission.

The document repository 114 stores all knowledge documentation that can be viewed within the system 100. In one embodiment, the document repository 114 will store all applicable records, including documentation files, screen and video capture files, Instant Messaging session files, threaded discussion files, and list items. The format of the stored records will be customized to the application which created the record. Thus, the documentation files may be in the format used by, for example, Microsoft Word or Microsoft Excel, both by Microsoft Corp. List items may include data about tasks, contacts or events.

The document repository 114 may be formed using a single data storage device or system, or it may be distributed over many such devices. In addition, the document repository 114 may include control devices for managing the records stored in the document repository 114. The document repository 114 thus forms a memory system configured to store data of a repository of knowledge transfer of information associated with transfer of knowledge.

In one embodiment, each record in the document repository 114 is tagged with metadata. Metadata is a file associated with a record or data stored in a record which is used by components of the system 100 but which is generally not visible or accessible to users. The metadata tags are used to classify records and permit searches on the records. The metadata is added to the record automatically by components of the system. The metadata may be based on content or key words of the record itself.

In one embodiment described herein, the system is implemented using the SharePoint product from Microsoft Corporation. In this embodiment, effective storage of screen captures and other data in the SharePoint file cabinets is an important aspect of the present knowledge transfer system. Video and screen capture files and other files must be stored and organized in a relevant file structure for effective search and retrieval from the knowledge repository.

To facilitate the storage of screen captures and other files into the knowledge repository 114, screen capture and other files are uploaded into SharePoint using a file structure network mapping. By using the virtual file system provided by SharePoint, users are able to upload screen capture and other content seamlessly as if they are saving a document to a network drive, while SharePoint will update its content repository automatically to make the upload a part of the knowledge transfer system.

In order to make screen captures and other files stored in the knowledge repository 114 searchable and retrievable by other users in the system, additional metadata about the screen captures are entered by users during the save process. Users will indicate information about the content they are creating that can be searched on by other SharePoint users. In some embodiments, the knowledge transfer application will automatically generate some or all of the metadata needed for screen captures and other files. Other embodiments require users to manually enter metadata information after saving their screen capture or other content. After content into the SharePoint virtual file cabinets, users enter the properties section for that file and input the necessary metadata. SharePoint automatically indexes this metadata, and makes it searchable throughout the Rapid Transition Suite application. Other embodiments, using commercial products other than Microsoft SharePoint or using custom applications, may include similar functionality.

The task completion wizard system 116 provides dynamically created task instructions to walk users through the necessary steps of each task, as defined by the Knowledge Transfer Plan, and to ensure that the necessary documentation is created for sign-off on each task. In one embodiment, the Task Completion Wizard system 116 provides steps on how to complete a task while providing integration with the collaboration tools 112. Thus, the task completion wizard system 116 may create a web page showing task steps and providing navigation tools or pop up menu access to the collaboration tools 112. Further, the task completion wizard system 116 provides links to related information and help guides for each task. For example, a help menu may be accessed by following a hyperlink on a task completion page. The help menu options are customized to the task, the application and even the user by the portal page creation process 108. Still further, the task completion wizard system 116 provides help links which are integrated with threaded discussions of the collaboration tools 112.

The task completion wizard system 116 also provides a clear path to sign off on each task. Sign off occurs when the apprentice and the expert, and perhaps their respective supervisors, agree that the apprentice has learned the appropriate knowledge or has become proficient in a given task. Each individual indicates approval and the knowledge transfer for the particular task is considered complete.

FIG. 4 illustrates a set of forms of an exemplary task completion wizard. The set of forms includes a first form 402 and a second form 404. Other forms may be provided depending on the task or other requirements of the particular engagement. The first form 402 provides a space 406 for entry of the user's name and a pop-up menu 408 for identification of the user's department. The second form 404 is specific to the task and provides links to launch collaboration tools in the context of the structured process including the current task.

FIG. 5 illustrates a set of forms of an exemplary proficiency evaluation wizard. The proficiency evaluation wizard produces dynamically created instructions to walk a user through evaluation of the proficiency of the apprentice to whom knowledge was transferred. The wizard is accessed by a current application owner or expert. The wizard produces a set of forms, such as forms 502, 504, providing steps on evaluation of the knowledge transfer recipient's proficiency in a given skill area. These steps are defined based on the Knowledge Transfer Plan. Further, the forms include links to related information and help guides to assist the expert to determine apprentice proficiency.

The form 502 thus includes a field 506 for entry of the user's name. In this form 502, the expert is identified. Further, the skill area under consideration is specified in a pop-up menu 508. The form 504 includes a link 510 which, upon clicking, redirects the user's web browser to a web page including the referenced guidelines. Preferably, these guidelines include a mixture of general guidelines for reviewing and evaluating an apprentice's work and specific guidelines keyed to the skill area defined in the field 508. Further, the form 504 includes a pop-up menu 512 for specifying the knowledge recipient or apprentice being evaluated and a pop-up menu 514 for specifying the apprentice's proficiency.

Figure 6:
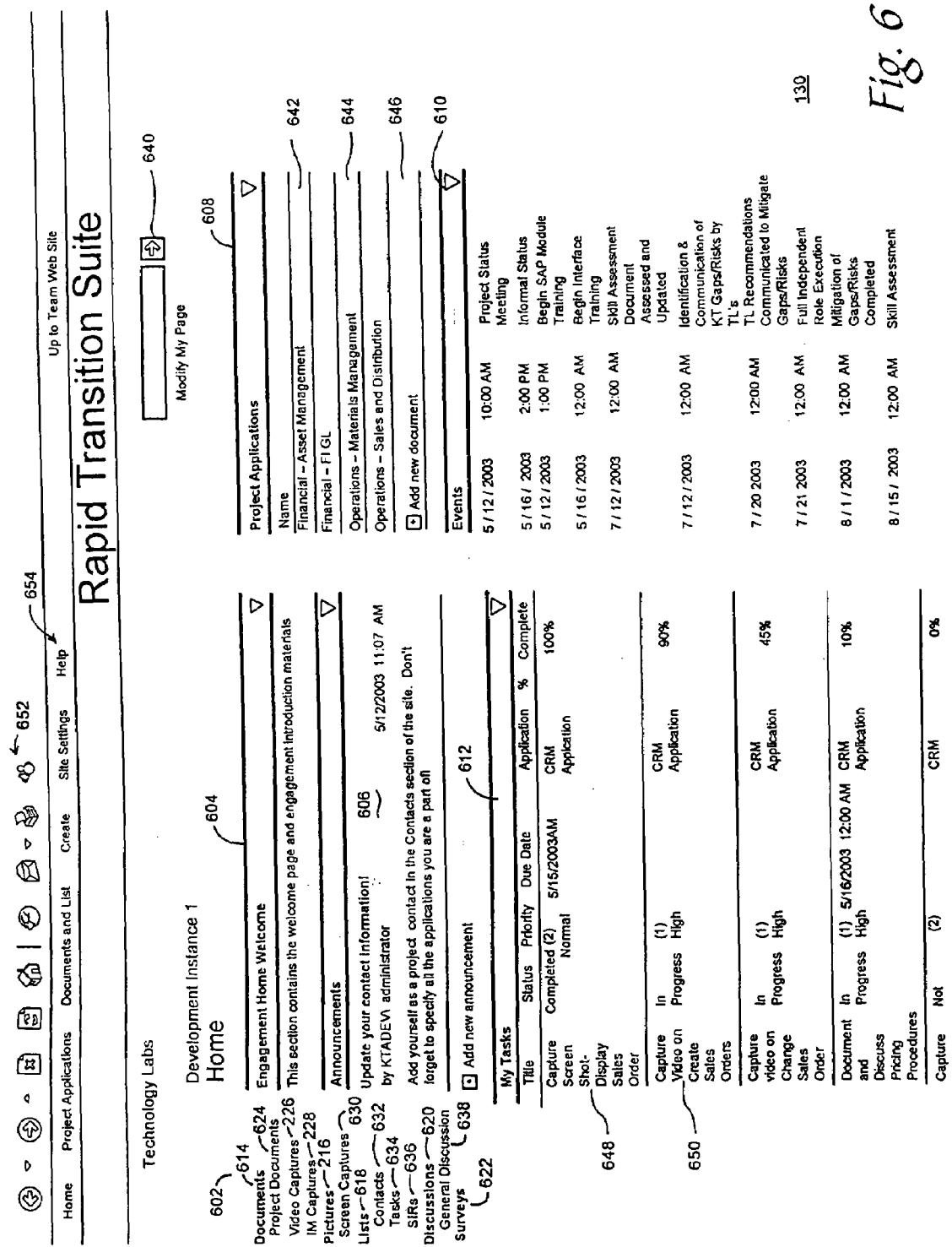

FIGS. 6-9 are screen shots illustrating aspects of the system 100 of FIG. 1. FIG. 6 illustrates an example of an engagement home page 130. The engagement home page 130 includes a navigation area 602, a welcome page link 604, an announcement area 606, applications links 608, and event listing 610 and a task field 612. The engagement home page 130 is configured as a web page with a plurality of hyperlinks. By directing a web browser to the URL of the engagement home page 130, the display of the engagement home page (illustrated in FIG. 6) is produced on a user's display screen. By clicking any of the links shown on the display, the user's web browser is redirected to another web page with more information and possibly more links. Displaying the engagement home page 130 and other pages is one embodiment for presenting to a transition administrator one or more on-line forms arranged to receive information about applications to be transferred as well as the experts and apprentices involved.

The navigation area 602 includes links to records in the document repository 114 (FIG. 1). The links include documents links 614, pictures links 616, list links 618, discussion links 620 and survey links 622. Within the group of document links 614 are project document links 624, video capture links 626 and instant messaging (IM) capture links 628. Similarly, within the pictures links 616 are gathered screen capture links 630. Within the group of list links 618, are gathered links to contacts 632, tasks 634 and other items 636. The discussion links 620 includes a link to general discussions 638. By clicking on any of the links shown in the navigation area 602, the user's web browser is redirected to another web page with more information and possibly more links. For example, following link 624 to project documents provides access to word processing and other files stored in the document repository 114.

The engagement home page 130 also includes a search window 640. The user may submit a search to the search window 640 to search for an entered text string within the records of the document repository 114. In one embodiment, the metadata associated with each record is searched for the entered search text.

The welcome page link 604 provides access to a welcome page of the system. As indicated in FIG. 6, the welcome page contains welcome information, background and introduction materials.

The announcement area 606 includes text information and links providing current announcements to users. Preferably, the links listed in the announcement area 606 provide access to other information by which a user can follow up with the information provided in the announcement.

The application links 608 provide access to project applications. By following one of the application links 608, a user accessing the engagement home page 130 can obtain additional information about each application involved in the engagement. For example, within a link 642 are gathered documents and other information about financial asset management applications. By following link 644, the user can obtain additional information about materials management applications. An additional link 646 invites the user to add new applications. In this way, users can access knowledge about all the applications involved in an engagement.

The event listing 610 includes calendar and time information for upcoming events. By following one of the links in the event listing 610, a user can obtain additional, detailed information about one of the events.

The task field 612 lists pending tasks of the user, along with detailed information about the tasks. The detailed information includes a title, task status, task priority, due date, the application to which the task is related, and an indication of percent completion. For example, a first task 648 is titled, Capture Screen Shot—Display Sales Order. The status of this task is "completed" and its priority is number two, normal. The due date for task completion was May 15, 2003 and the application relates to the CRM application. Since the task has been completed, it's listed as one hundred percent complete. A second task 650 is titled, "capture video on create sales orders." The status of this task is "in progress" and its priority is number one, high. No due date is listed for this task and it relates to the same application, the CRM application. According to the listing, the task is ninety percent complete.

In addition to these areas, the engagement home page 130 and other pages illustrated in this exemplary embodiment include additional links and menu items. Conventional Microsoft Internet Explorer icons 652 are provided at the top of the engagement home page 130 for user navigation and operation of the browser. Further, pop-up menus 654 are also available for additional navigation and control operation.

Figure 7:
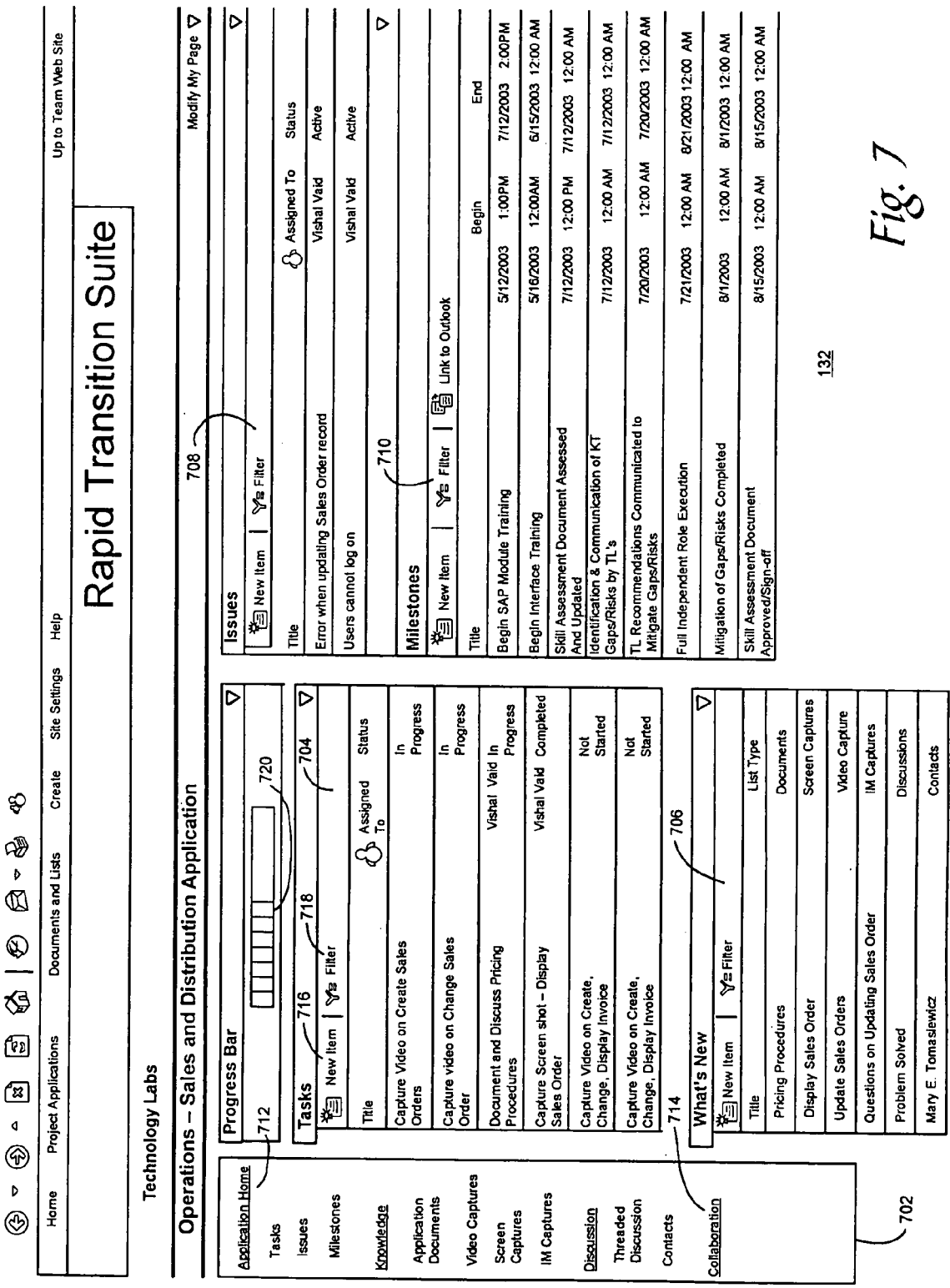

FIG. 7 illustrates an exemplary embodiment of an application home page 132. As noted above, application home pages provide a central team view of all knowledge to be transferred for a single application. Data based on information entered in the engagement home page 130 and other pages is stored in a memory system as knowledge transfer information data entered by the transition administrator using one or more on-line forms. Actual entered data may be stored, or the entered data may be processed, for example, according to best practice data, and subsequently produced data stored.

Based on the stored knowledge transfer information data, application home pages are created for respective experts and respective apprentices. Each of the application home pages and the individual user home pages are preferably accessible through a web browser operating on a computing device such as a personal computer.

FIG. 7 illustrates an exemplary embodiment of an application home page 132. As noted above, application home pages provide a central team view of all knowledge to be transitioned for a single application. Current knowledge owners, or experts, and recipients, or apprentices, use this site as the central point to perform knowledge transfer for each application.

The application home page 132 includes a navigation area 702, a tasks area 704, a news area 706, an issues area 708 and a milestones area 710. The navigation area 702 provides links 712 to other locations in the system. The links 712 are organized functionally. Thus, one group of links allows navigation among the different areas of the application home page. A second group of links allows access to knowledge or other information stored in the document repository 114. These links take the user to, for example stored documents, video captures, screen captures, etc. A third group of links provides access to stored discussion materials, such as stored threaded discussion files. A final link 714 provides access for the user to the collaboration tools 112.

The tasks area 704 includes a list of tasks to be completed for completion of knowledge transfer for an application. Each task in the list is displayed as a link to a web page providing additional information about that task. Displayed in the tasks area is summary information for each task, including the task title, the user to which the task is assigned and task status.

The news area 706 provides a list of links to new collaboration materials that have been produced by users involved in transitioning of the task. By clicking on a link in the news area 706, a user accessing the application home page 132 can view additional information about the new item and review the information associated with the item. Each item in the news area includes a title and a list type.

The issues area includes a list of links to records defining problems or topics that need discussion or collaboration. For example, when a user identifies a system problem, the user may initiate a new item for placement in the issues area 708. Other users may click on a link listed in the issues area to obtain additional information about the issue and its resolution.

The milestones area includes a list of links defining milestones or accomplishments associated with the application to which the application home page 132 is assigned. For each milestone, a title is listed along with scheduled begin and end dates. In the example of FIG. 7, the milestones move from the initial phase of knowledge transfer, "begin SAP model training," to the final phase of approval and sign-off. By clicking on any of the links in the milestones area, a user can obtain more information about a particular milestone and its completion.

Each of the areas 704, 706, 708, 710 includes menu items for additional user control. For example, in the illustrated embodiment, each of the areas includes a new item menu entry 712 and a filter entry 714. By clicking on the new item menu entry 712, a user may initiate a new item in the particular area. By clicking on the filter entry 714, the user may select list entries from the area satisfying particular filter criteria.

In addition, the embodiment of the application home page 132 of FIG. 7 also includes a progress bar 720. For the application associated with the home page 132, the progress bar gives a rough indication of the extent to which knowledge transfer for the application is complete. As the knowledge transfer proceeds, the highlighted portion of the progress bar expands to indicate advancement toward completion of knowledge transfer. In one embodiment, a component of the system evaluates knowledge transfer for each role-specific function. In this embodiment, the evaluation is made along a continuum from no knowledge transfer to substantially complete knowledge transfer. Thus, displaying the progress bar provides a substantially real-time, humanly readable output of the evaluation of knowledge transfer.

FIG. 8 illustrates one embodiment of a web page 800 which provides access to threaded discussions in the knowledge transfer system 100 of FIG. 1. The web page 800 includes a navigation area 802, a threaded discussion access area 804 and a search box 806.

The navigation area includes a view selection area 810 and an action selection area 812. The view selection area 810 permits a user to select the desired view of information about the threaded discussions accessible using the web page 800. By clicking on the links illustrated in the view area, the user may change the display of the references to the threaded discussions. Thus, options are provided for a threaded view in which the hierarchy of the threaded discussions is visible, or a flat view in which the hierarchy is suppressed. In addition, several different application view possibilities are provided for selection by the user. In the actions area 812, the user is given the option to initiate several actions. In a first action, a user can initiate an alert system through which the user is alerted when a new addition to a threaded discussion is available. In the modify settings area, the user can customize the view displayed in the web page 800.

In the discussion view area 804, information about currently accessible threaded discussions is provided in accordance with the view selected in the view area 810. In the illustration of FIG. 8, the CRM application view is selected. In accordance with this view, each threaded discussion is displayed as a subject entry along with information about the author of the entry and the date of modification. At the left-hand side of each entry, a prompt is provided. By clicking on this prompt, the user can expand the threaded discussion and view the hierarchy of the discussion.

The search box 806 allows the user to enter one or more textual terms for searching. In response, the system 100 provides references, such as threaded discussion elements, which match the search term.

FIG. 9 illustrates a web page 900 which provides access to stored video capture records in the knowledge transfer system 100 of FIG. 1. The web page 900 permits user interaction using audio and visual messages. The web page 500 includes a navigation area 902, a video capture list area 904 and a search box 906.

The navigation area 902 includes a view selection area 908 and an actions area 910. The view selection area 908 includes a menu or series of links which permit the user to select a particular view or display format for the video capture records stored in the document repository 114 (FIG. 1). The actions area 910 provides several options for additional actions that the user may perform or may specify for subsequent performance.

The video capture list area 904 lists video capture records that are available for viewing. Any suitable information may be listed, but in the illustrated embodiment, each listing includes a record type, the name of the record, a description of the record and a last-modified indicator. The record type indicates the type or format of the data file, such as a Windows media file. The name indicates the name assigned to the file, such as "Update Sales Order" or "Manage Invoice". The description for a record includes a brief textual description of the contents of the video capture record. The last modified field indicates the user who last modified the record. The video capture record list area 904 further includes a menu bar 912, which provides several action options for use by the user in accessing video capture records. For example, the user may initiate a new document, creating a new video capture. In order to view a previously captured video record, the menu provides an upload document entry. Other types of entries may be substituted as well.

The search box 906 allows a user to enter a text string to be searched in the document repository 114 to locate relevant records. The menu bar 912 includes a filter menu item 914 which can be used to further refine the search results produced by the search. Filter criteria may be entered in order to select particular search results.

Figure 10:
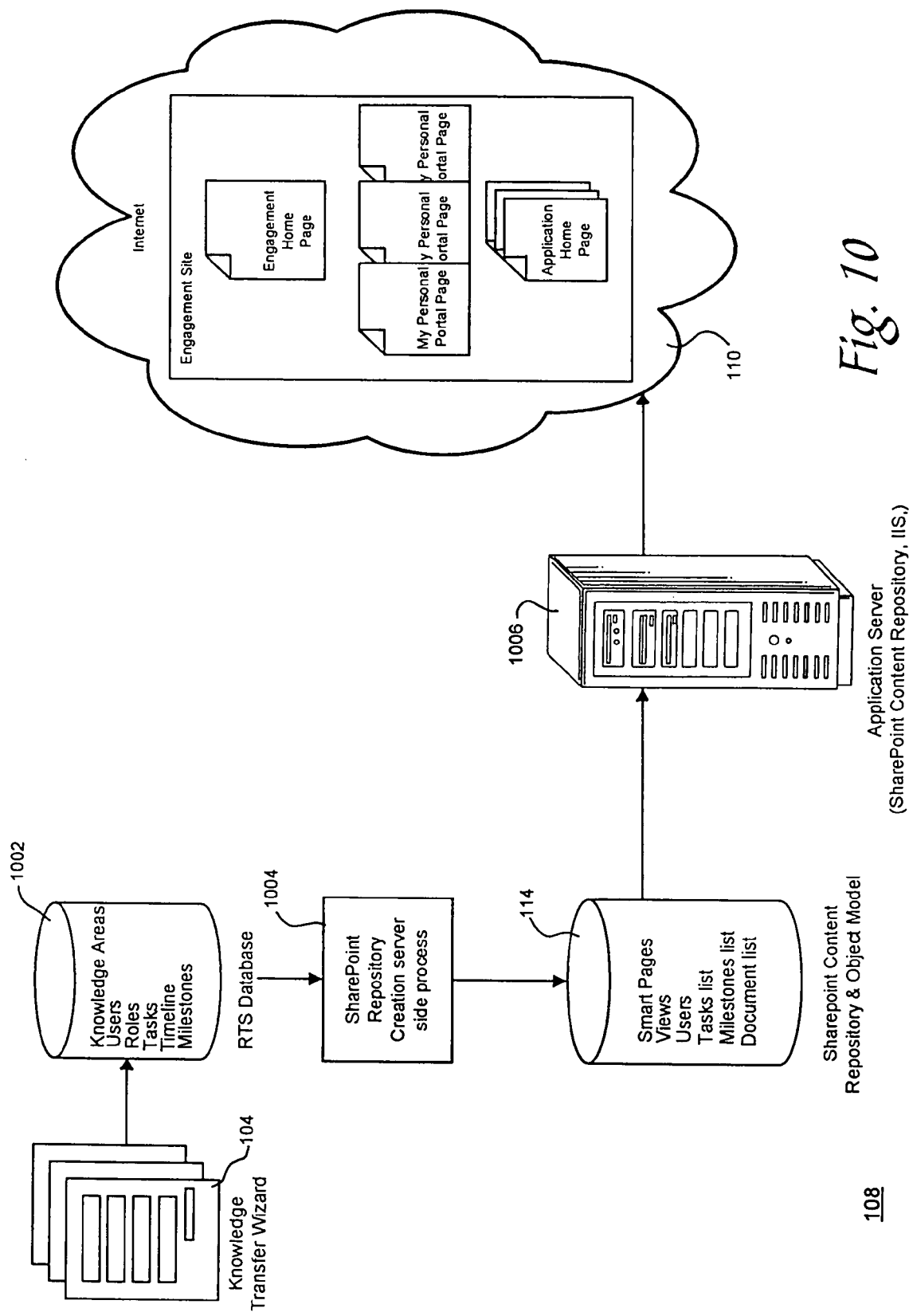
FIG. 10 illustrates the portal page creation process of FIG. 1.

FIG. 10 illustrates the portal page creation process 108 of FIG. 1. FIG. 10 is a functional block diagram illustrating the process which takes user input from a Knowledge Transfer Plan and builds a project engagement site which can be used to carry out the knowledge transfer process. The process 108 includes an RTS database 1002, a repository creation server side process 1004, and an application server 1006. These elements operate in conjunction with elements described in detail above in connection with FIG. 1.

The process begins with the Knowledge Transfer Plan Wizard system 104. This system is generally a combination of on-line forms and Microsoft Excel templates. A user enters data into forms of the wizard system 104 and the wizard system 104 collects, organizes and stores the data which is specific to the engagement and the applications. Data, along with the Knowledge Transfer Plan data, are stored in the RTS database. In one embodiment, data is extracted from the Excel templates formed by the knowledge transfer wizard system 104, using extensible mark-up language (XML). The data stored in the RTS database 1002 may be stored in any form or format. In the illustrated embodiment, the data defines information such as knowledge areas, users, roles, tasks, a timeline and milestones.

The repository creation server side process 1004 operates on a server accessible over the network. The process 1004 retrieves data stored in the RTS database 1002 and uses the retrieved data to create the content repository 114 for the engagement. The repository creation server side process 1004 creates Smart Pages using Page Templates. Smart Pages hold web parts to display information about the engagement and its applications. Further, the repository creation server side process 1004 creates users and their roles based on data stored in the Knowledge Transfer Plan database, RTS database 1002. Creation of users also involves accessing and creating security and access permission information assigned to a user, a site group or a cross-site group for a list or a site.

Tasks and associated information about the tasks will be created by the SharePoint repository creation server side process 1004 based on data stored in the Knowledge Transfer Plan database, RTS database 1002. In the illustrated embodiment, tasks are considered as lists.

Events and announcements are created by the repository creation server side process 1004 based on data stored in the Knowledge Transfer Plan database, RTS database 1002. Similar to tasks, events and announcements are considered to be lists in the illustrated embodiment. This embodiment uses a SharePoint repository creation process, as is known in the art. SharePoint software and other products are available from Microsoft Corporation, Redmond, Wash.

To facilitate the intelligent storage of documents in the document repository 114, a folder structure is created based on data stored in the Knowledge Transfer Plan database 1002. Existing folders are accessed and new folders are created. Further content and hierarchy is organized in response to the information contained in the Knowledge Transfer Plan database.

In accordance with the SharePoint repository embodiment described herein, every list in the repository includes a set of views that filter list data for each engagement application. A view is created for each application to display applications specific content on a SharePoint Smart Page. After operation of the portal page creation process 108, the engagement site 10 is created. Each application home page provides access to information about specific applications. Access is controlled according to security and access rights defined by the Knowledge Transfer Plan. Users have assigned home pages which also provide access to application information. An engagement home page is created for management and other functions. Each of the pages created at the engagement site has access to collaboration tools, the document repository and a task completion wizard system for the actual work of the knowledge transfer process.

Figure 11:
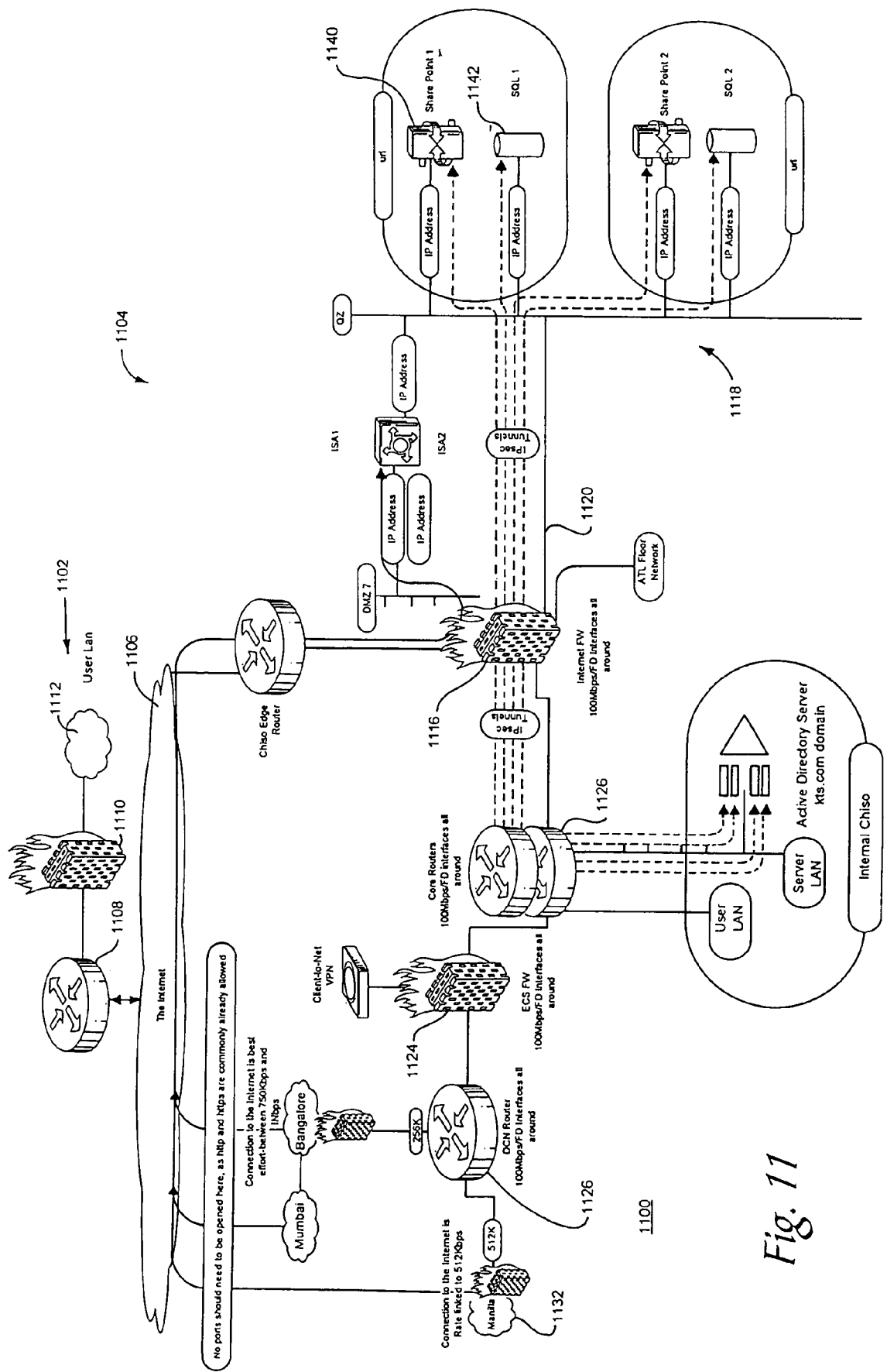
FIG. 11 is a schematic diagram of a system for rapid knowledge transfer among workers.

FIG. 11 is a schematic diagram of a system for rapid knowledge transfer among workers. FIG. 11 illustrates one embodiment of the system 100 of FIG. 1. The system 1100 includes a client system 1102 in communication with a system 1104 of an outsourcing agency using communication over the internet 1106. The system 1100 permits knowledge transfer in accordance with the system and method described herein from experts at the client system 102 to apprentices at the outsourcing agency system 1104.

The client system includes an edge router 1108, a firewall 1110 and a local area network 1112. The edge router 1108 permits communication using suitable internet protocol between the internet 1106 and the client system 1102. The firewall 1110 limits access to permitted users. The local area network 1112 provides communication to computer systems operated by the experts who are current knowledge owners.

The outsourcing agency system 1104 includes an edge router 1108, a firewall 1116, a document repository system 1118 accessible over a network 1120, core routers 1122, a firewall 1124, a router 1126 and first, second and third outsourcing sites 1128, 1130, 1132. Knowledge from the experts at the client system 1102 is to be transferred to apprentices at the outsourcing sites 1128, 1130, 1132. In the illustrated embodiment, the outsourcing sites are located in Bangalore and Mumbai, India and Manila, the Philippines. In this example, significant economic advantages are realized by outsourcing job functions from the client site 1112 to the outsourcing site offshore. However, it is to be understood that the system is not geographically limited. In particular, using the Internet and other networks, along with Internet protocols for data communication, the client personnel and the outsourcing agency personnel may be located anywhere in the world.

In accordance with the system and method described herein, the knowledge transfer process is implemented in conjunction the document repository system 1118. The document repository system includes first and second servers 1140 and associated databases 1142. The web pages that are generated by the system, including the engagement home page 130, user home pages 134 and application home pages 132 are served by the servers 1140. As records, including the files, documents, lists, etc., are created, the records are stored in the databases 1142. Client personnel at the client site 1102 have access to these web pages and records over the network, including the internet 1106 and the network 1120. Similarly, apprentices located at the outsourcing sites 1128, 1130, 1132 have access to these records and other information over the network 1120.

It is to be understood that the network or architecture of FIG. 11 is illustrative only. Other systems will require substantially different architectures, customized to meet the particular capabilities and requirements of the knowledge transfer engagement, the client system and the outsourcing agency system.

From the foregoing, it can be seen that the embodiments disclosed herein provide an improved system and method for rapid knowledge transfer among workers. This system and method are particularly well adapted to the outsourcing context. The disclosed system presents easy-to-use web page data entry and access points which may readily be operated by non-technical individuals of the client and the outsourcing agency. The process of defining tasks and assigning roles is automated so that, even in a knowledge transfer engagement in which a large number of experts must transfer knowledge to an even larger number of apprentices, the process can proceed without substantial involvement by technically trained personnel. The system is flexible and may be used with a wide variety of engagements. No specific tailoring of the system is required. Instead, the system responds to the unique requirements and goals of a particular engagement to produce a customized engagement website usable by technical and non-technical experts and apprentices alike. As a result, customized programming and the programmers required to perform it, are obviated. This substantially reduces the cost and time required for a knowledge transfer operation.

While a particular embodiment of the present invention has been shown and described, modifications may be made. Accordingly, it is therefore intended in the appended claims to cover such changes and modifications which follow in the true spirit and scope of the invention.

We claim:

1. A knowledge transfer system for transferring knowledge from expert workers at a client location to apprentice workers at an outsourcing location, the knowledge transfer system comprising:

a memory system configured to store a Knowledge Transfer Plan that defines knowledge and tasks that need to be transferred from the expert workers to the apprentice workers;

program code and associated data defining role-specific portals for individual expert workers and apprentice workers, the program code configured to access the memory system for storage and retrieval of data associated with the role-specific portals;

program code defining one or more collaboration systems for two-way communication between individual expert workers and individual apprentice workers;

a multi-media knowledge repository configured to store work objects created by the expert workers and the apprentice workers during the knowledge transfer process;

portal page creation code responsive to predetermined Knowledge Transfer Plan data for configuring the program code and the associated data defining role-specific portals; and monitoring and tracking code which monitors progress of individual apprentice workers in fulfilling assigned tasks.

2. The knowledge transfer system of claim 1 further comprising a memory configured to store Knowledge Transfer Plan data defining respective individual expert workers and respective apprentice workers and knowledge and tasks to be transferred from the respective individual expert workers to respective apprentice workers by specific dates.

3. The knowledge transfer system of claim 2 wherein the portal page creation code comprises:

first code configured to retrieve Knowledge Transfer Plan data from the memory;

second code configured to create, based on the retrieved Knowledge Transfer Plan data, one or more user web pages defined with controlled access by the respective individual expert workers and the respective apprentice workers; and third code configured to create, based on the retrieved Knowledge Transfer Plan data, one or more application home pages for respective applications, the one or more application home pages defined with controlled access by specific users involved in the transfer of knowledge about that application.

4. The knowledge transfer system of claim 3 wherein the one or more collaboration systems comprise collaboration tools accessible by individual expert workers and apprentice workers capturing the knowledge transfer information associated with the transfer of knowledge from the individual expert workers to the apprentice workers.

5. The knowledge transfer system of claim 4 wherein the collaboration tools comprise at least one of:

a text editing routine for creating discussion threads;

an instant messaging routine, an electronic mail routine, an audio/video data handling routine, and
a desktop sharing and capture routine.

6. The knowledge transfer system of claim 5 further comprising a task completion routine configured to provide to individual apprentice workers instructions for completion of knowledge transfer task associated with the individual apprentice worker by the program code and associated data defining a role-specific portal for the individual apprentice worker.

7. The knowledge transfer system of claim 4 wherein the memory system, the one or more user web pages, the one or more application home pages and the collaboration tools are accessible using Internet communication protocols.

8. The knowledge transfer system of claim 1 wherein the program code defining one or more collaboration systems comprises document collaboration code for sharing defined documents among the individual expert workers and individual apprentice workers.

9. The knowledge transfer system of claim 1 wherein the program code defining one or more collaboration systems comprises multimedia collaboration code for sharing defined multimedia files among the individual expert workers and individual apprentice workers.

10. A method for transferring job-related knowledge from a plurality of experts to a plurality of apprentices who are located remotely from the experts, the method comprising:
presenting to a transition administrator one or more on-line forms arranged to receive information about applications to be transferred, the experts and the apprentices;
storing in a memory system data entered by the transition administrator using the one or more on-line forms as a Knowledge Transfer Plan;
based on the stored Knowledge Transfer Plan data, creating application home pages for the applications to be transferred and individual user home pages for respective experts and respective apprentices, each of the application home pages and the individual user home pages being accessible through a web browser operating on a computing device; and
based on the stored knowledge transfer information data and on the ongoing knowledge transfer tasks performed by the respective experts and respective apprentices, generating status information about the transfer of job-related knowledge for monitoring the transfer of job-related knowledge.

11. The method of claim 10 wherein presenting the one or more on-line forms comprises:
opening a Knowledge Transfer Plan Wizard web page on a web browser of the transition administrator, the wizard web page including prompts and data entry fields;
in response to data received at the wizard web page, opening subsequent wizard pages on the web browser;
on the subsequent wizard pages, providing prompts specific to one of an application and a user defined by the data received at the wizard web page; and
storing in the memory system application data and user data based on information received at the subsequent wizard pages.

12. The method of claim 10 wherein creating application home pages comprises:
creating a new home page for each application to be transferred;
defining secure access rights to the new home page for associated users based on the knowledge transfer information;
defining links to task pages, document pages and discussion thread pages associated with the application based on the knowledge transfer information; and
providing a link to a Task Completion Wizard page for completing tasks associated with the application based on the knowledge transfer information.

13. The method of claim 10 wherein creating individual user home pages comprises:
creating a new home page for a user;
defining secure access rights to the new home page for the user and associated users based on the Knowledge Transfer Plan;
defining links to application home pages, document pages and discussion thread pages associated with the individual user based on the Knowledge Transfer Plan;
providing a link to a Task Completion Wizard page for completing tasks associated with the individual user based on the Knowledge Transfer Plan.

14. A method for transferring knowledge among workers, the method comprising:
developing a Knowledge Transfer Plan;
based at least in part on the Knowledge Transfer Plan, creating role-specific portals for the workers;
storing in a repository accessible through the role-specific portals data defining knowledge transfer information; and
storing in the repository data related to tracking and monitoring the progress of the knowledge transfer among workers.

15. The method of claim 14 wherein developing the Knowledge Transfer Plan comprises receiving knowledge about a respective transfer role of respective workers.

16. The method of claim 14 wherein storing data comprises storing project documentation.

17. The method of claim 14 wherein storing data comprises storing work objects created during knowledge transfer.

18. The method of claim 14 wherein storing data comprises storing multi-media data.

19. The method of claim 14 further comprising:
storing information about completion of knowledge transfer.

20. The method of claim 19 further comprising:
comparing the stored information with the Knowledge Transfer Plan.

21. The method of claim 20 further comprising:
based on the comparison, providing a real-time output report.

22. A knowledge transfer method comprising:
storing information related to one or more role specific functions;
receiving information related to a role specific function;
evaluating along a continuum from no knowledge transfer to a substantially complete knowledge transfer for each role specific function; and
providing a substantially real-time humanly readable output of the evaluation.

23. A system for transfer of procedure know-how, the system comprising:
a processor configured to present a query to a know-how expert, the query including questions associated with one or more defined roles for the procedure; and
a memory configured to store the answers to the query, wherein the processor is configured to create role-specific portals, each role-specific portal associated with one or more defined roles, based on the answers to the query.

24. The system of claim 23 further comprising a communications link to the processor, the communications link providing for remote access to the role-specific portals.

25. The system of claim 24 where the communications link provides communication access to the Internet.

26. The system of claim 23 where the role-specific portal comprises an asynchronous communications link between a role mentor and at least one corresponding role apprentice, the communications link providing communications tools to the role mentor and the role apprentice.

27. The system of claim 26 further comprising a know-how transfer assessment tool, the assessment tool providing a measure for the transfer of know-how from a mentor to a corresponding apprentice.

28. The system of claim 27 wherein the know-how transfer assessment tool includes a measure for the transfer of know-how from one or more mentors to one of more role apprentices.

29. The system of claim 26 where the role-specific portal comprises at least one of:
 an instant messenger service,
 a bulletin board,
 an event planner,
 an electronic mail application, and
 a screen capture application.

30. A knowledge transfer system for transferring knowledge from expert workers at a client location to apprentice workers at an outsourcing location, the knowledge transfer system comprising:
 a memory system configured to store a Knowledge Transfer Plan that defines knowledge and tasks that need to be transferred from the expert workers to the apprentice workers;
 program code and associated data defining role-specific portals for individual expert workers and apprentice workers, the program code configured to access the memory system for storage and retrieval of data associated with the role-specific portals;
 program code defining one or more collaboration systems for two-way communication between individual expert workers and individual apprentice workers;
 a multi-media knowledge repository configured to store work objects created by the expert workers and the apprentice workers during the knowledge transfer process;
 portal page creation code responsive to predetermined Knowledge Transfer Plan data for configuring the program code and the associated data defining role-specific portals;
 program code defining a wizard system operative to lead a user of the knowledge transfer system through processes of creating or updating the Knowledge Transfer Plan; and
 monitoring and tracking code which monitors progress of individual apprentice workers in fulfilling assigned tasks.

31. The knowledge transfer system of claim 30 wherein the program code defining the wizard system comprises code to define web-based forms containing text input blocks and other input devices configured to receive user-defined applications and user information.

32. The knowledge transfer system of claim 31 further comprising:
 a set of Knowledge Transfer Best Practices; and
 a Knowledge Transfer Template,
wherein the set of Knowledge Transfer Best Practices and the Knowledge Transfer Template form inputs to the program code defining the wizard system.

33. The knowledge transfer system of claim 31 wherein the program code defining the wizard system is operative to perform administrative tasks including creating user accounts for respective expert workers and respective apprentice workers and defining vocabulary to be used in the knowledge transfer system.

* * * * *